(12) United States Patent
Brown et al.

(10) Patent No.: US 11,177,498 B1
(45) Date of Patent: Nov. 16, 2021

(54) REDOX FLOW BATTERIES, COMPONENTS FOR REDOX FLOW BATTERIES AND METHODS FOR MANUFACTURE THEREOF

(71) Applicant: Ampcera Inc., Milpitas, CA (US)

(72) Inventors: James Emery Brown, Tucson, AZ (US); Hui Du, Tucson, AZ (US); Chen Chen, Tucson, AZ (US); Sumin Zhu, San Francisco, CA (US)

(73) Assignee: AMPCERA INC., Milpitas, CA (US)

( * ) Notice: Subject to any disclaimer, the term of this patent is extended or adjusted under 35 U.S.C. 154(b) by 38 days.

(21) Appl. No.: 16/653,282

(22) Filed: Oct. 15, 2019

Related U.S. Application Data

(60) Provisional application No. 62/745,510, filed on Oct. 15, 2018.

(51) Int. Cl.
| | |
|---|---|
| *H01M 8/18* | (2006.01) |
| *H01M 8/0289* | (2016.01) |
| *H01M 8/1009* | (2016.01) |

(52) U.S. Cl.
CPC ......... *H01M 8/188* (2013.01); *H01M 8/0289* (2013.01); *H01M 8/1009* (2013.01)

(58) Field of Classification Search
CPC ... H01M 8/188; H01M 8/1009; H01M 8/0289
USPC .......................................................... 429/51
See application file for complete search history.

(56) References Cited

U.S. PATENT DOCUMENTS

| | | | |
|---|---|---|---|
| 3,508,994 A | 4/1970 | Nyrop | |
| 4,255,208 A | 3/1981 | Deutscher et al. | |
| 4,668,593 A | 5/1987 | Sammells | |
| 4,770,908 A | 9/1988 | Mori et al. | |
| 4,846,931 A | 7/1989 | Gmitter et al. | |
| 5,006,247 A | 4/1991 | Dennison et al. | |
| 5,160,618 A | 11/1992 | Burggraaf et al. | |
| 5,215,729 A | 6/1993 | Buxbaum | |
| 5,269,926 A | 12/1993 | Webster et al. | |
| 5,668,188 A | 9/1997 | Whinnery et al. | |
| 6,071,795 A | 6/2000 | Cheung et al. | |
| 6,352,909 B1 | 3/2002 | Usenko | |
| 6,461,772 B1 | 10/2002 | Miyake et al. | |
| 6,475,661 B1 | 11/2002 | Pellegri et al. | |
| 6,524,736 B1 | 2/2003 | Sompalli et al. | |
| 6,565,632 B1 | 5/2003 | van Hassel | |
| 6,649,559 B2 | 11/2003 | Drost et al. | |
| 6,699,276 B2 | 3/2004 | Sogard et al. | |

(Continued)

FOREIGN PATENT DOCUMENTS

| | | |
|---|---|---|
| CN | 102718494 B | 3/2014 |
| EP | 0524678 A1 | 1/1993 |

(Continued)

OTHER PUBLICATIONS

Brushett et al.: An All-Organic Non-aqueous Lithium-Ion Redox Flow Battery, Advanced Energy Materials, 2012, vol. 2, pp. 1390-1396.

(Continued)

*Primary Examiner* — Gary D Harris

(74) *Attorney, Agent, or Firm* — Michael P. Alexander

(57) ABSTRACT

A redox flow battery includes a positive terminal, a negative terminal, and a solid state ionic conductive membrane on a macro porous support scaffold between the positive terminal and the negative terminal.

20 Claims, 29 Drawing Sheets

(56) References Cited

U.S. PATENT DOCUMENTS

| | | | |
|---|---|---|---|
| 6,740,604 | B2 | 5/2004 | Kelly et al. |
| 6,974,521 | B2 | 12/2005 | Schermer |
| 7,108,813 | B2 | 9/2006 | Kang et al. |
| 7,125,626 | B2 | 10/2006 | Kato |
| 7,163,713 | B2 | 1/2007 | Jacobson et al. |
| 7,182,894 | B2 | 2/2007 | Kumar et al. |
| 7,316,919 | B2 | 1/2008 | Childs et al. |
| 7,442,303 | B2 | 10/2008 | Jacobson |
| 7,547,393 | B2 | 6/2009 | Ramaswamy et al. |
| 7,621,979 | B2 | 11/2009 | Kaigawa et al. |
| 7,767,256 | B2 | 8/2010 | Gu et al. |
| 7,767,257 | B2 | 8/2010 | Gu et al. |
| 7,820,321 | B2 | 10/2010 | Home et al. |
| 7,867,669 | B2 | 1/2011 | Liu et al. |
| 8,313,968 | B2 | 11/2012 | Elgawadi |
| 8,506,790 | B2 | 8/2013 | Balagopal et al. |
| 8,691,413 | B2 | 4/2014 | Esswein et al. |
| 8,715,392 | B2 | 5/2014 | Liu |
| 8,785,023 | B2 | 7/2014 | Home et al. |
| 8,889,300 | B2 | 11/2014 | Bugga et al. |
| 9,156,006 | B2 | 10/2015 | Yip et al. |
| 9,293,777 | B2 | 3/2016 | Wang et al. |
| 9,300,000 | B2 | 3/2016 | Jansen et al. |
| 9,368,775 | B2 | 6/2016 | Visco et al. |
| 9,419,299 | B2 | 8/2016 | Visco et al. |
| 9,512,041 | B2 | 12/2016 | Mcevoy et al. |
| 9,724,640 | B2 | 8/2017 | Joo et al. |
| 9,954,229 | B2 | 4/2018 | Xiao |
| 10,079,391 | B2 | 9/2018 | Kjeang et al. |
| 10,088,751 | B2 | 10/2018 | Yang et al. |
| 10,525,417 | B2 | 1/2020 | Newbloom et al. |
| 2005/0227455 | A1 | 10/2005 | Park et al. |
| 2006/0025866 | A1 | 2/2006 | Serafin et al. |
| 2007/0087328 | A1 | 4/2007 | Sleytr et al. |
| 2008/0142373 | A1 | 6/2008 | Joshi et al. |
| 2008/0173540 | A1 | 7/2008 | Joshi et al. |
| 2008/0299377 | A1 | 12/2008 | Gu et al. |
| 2009/0000475 | A1 | 1/2009 | Fekety et al. |
| 2009/0035631 | A1 | 2/2009 | Zagaja et al. |
| 2009/0057162 | A1 | 3/2009 | Balagopal et al. |
| 2009/0130477 | A1 | 5/2009 | Hou et al. |
| 2010/0330435 | A1* | 12/2010 | Nemeth ............ H01M 8/184 429/402 |
| 2011/0201180 | A1 | 8/2011 | Elgawadi |
| 2011/0223450 | A1 | 9/2011 | Home et al. |
| 2012/0135278 | A1 | 5/2012 | Yoshie et al. |
| 2013/0011704 | A1 | 1/2013 | Home et al. |
| 2013/0048509 | A1 | 2/2013 | Balagopal et al. |
| 2013/0323611 | A1 | 12/2013 | Wang et al. |
| 2016/0334699 | A1 | 11/2016 | Doi et al. |
| 2019/0181461 | A1 | 6/2019 | Weber et al. |
| 2019/0217252 | A1 | 7/2019 | Newbloom et al. |

FOREIGN PATENT DOCUMENTS

| | | |
|---|---|---|
| EP | 2545984 A1 | 1/2013 |
| GB | 2565070 A | 2/2019 |
| JP | 5674040 B2 | 2/2015 |

OTHER PUBLICATIONS

Chen et al.: Lithium-Organic Nanocomposite Suspension for High-Energy-Density Redox Flow Batteries, ACS Energy Letter, 2018, vol. 3, pp. 1991-1997.

Delmdahl et al.: Large-Area Laser-Lift-Off Processing in Microelectronics, Physics Procedia, 2013, vol. 41, pp. 241-248.

Ding et al.: A High-Performance All-Metallocene-Based, Non-Aqueous Redox Flow Battery, Energy & Environmental Science, 2017, vol. 10, pp. 491-497.

Doughty et al.: Batteries for Large-Scale Stationary Electrical Energy Storage, The Electrochemical Society Interface, 2010, vol. 19, No. 3, pp. 49-53.

Duduta et al.: Semi-Solid Lithium Rechargeable Flow Battery, Advance Energy Materials, 2011, vol. 1, No. 4, pp. 511-516.

Hamelet et al.: Non-Aqueous Li-Based Redox Flow Batteries, Journal of the Electrochemical Society, 2012, vol. 159, No. 8, pp. A1360-A1367.

Jia et al.: High-Energy Density Nonaqueous All Redox Flow Lithium Battery Enabled with a Polymeric Membrane, Science Advances, 2015, vol. 1, No. 10, p. e1500886.

Kouras et al.: Macro-Porous Ceramic Supports for Membranes Prepared from Quartz Sand and Calcite Mixtures, Journal of the European Ceramic Society, 2017, vol. 37, No. 9, pp. P3159-P3165.

Lee et al.: Water-Soluble Epitaxial NaCl Thin Film for Fabrication of Flexible Devices, Scientific Reports, 2017, vol. 7, No. 8716, pp. 1-7.

Liao et al.: A Macro-Porous Graphene Oxide-Based Membrane as a Separator with Enhanced Thermal Stability for High-Safety Lithium-ion Batteries, Royal Society of Chemistry Advances, 2017, vol. 7, No. 36, pp. 22112-22120.

Lobankova et al.: Laser Lift-Off Technique, Modem Technique and Technologies 2012, pp. 26-27.

Placke et al.: Lithium ion, Lithium Metal, and Alternative Rechargeable Battery Technologies: The Odyssey for High Energy Density, Journal of Solid State Electrochemistry, 2017, vol. 21, No. 7, pp. 1939-1964.

Prifti et al.: Membranes for Redox Flow Battery Applications, Membranes, 2012, vol. 2, No. 2, pp. 275-306.

R. Jonson and P. McGinn, Tape Casting and Sintering of Li7La3Zr1.75Nb0.25Al0.1O12 with Li3BO3 Additions, Solid State Ionics, 2018, vol. 323, No. 1, pp. 49-55.

Salimi Jazi et al.: Spray-Formed, Metal-Foam Heat Exchangers for High Temperature Applications, Journal of Thermal science and Engineering Applications, 2009, vol. 1, No. 3, pp. 031008 (7 pages).

Skyllas-Kazacos et al.: Progress in Flow Battery Research and Development, Journal of Electrochemical Socity 2011, vol. 158, No. 8, pp. R55-R79.

G. Soloveichik: Battery Technologies for Large-Scale Stationary Energy Storage, Annual Review of Chemical and Biomolecular Engineering, 2011, vol. 2, pp. 503-527.

Wang et al.: Li-Redox Flow Batteries Based on Hybrid Electrolytes: At the Cross Road between Li-ion and Redox Flow Batteries, Advance Energy Materials, 2012, vol. 2, No. 7, pp. 770-779.

Wang et al.: Recent Progress in Redox Flow Battery Research and Development, Advance Functional Materials, 2012, vol. 23, No. 8, pp. 1-17.

Weber et al.: Redox Flow Batteries: A Review, Journal of Applied Electrochemistry, 2011, vol. 41, pp. 1137-1164.

Yang et al.: A Membrane-Free Lithium/Polysulfide Semi-Liquid Battery for Large-Scale Energy Storage, Energy & Environmental Science, 2013, vol. 6, pp. 1552-1558.

Yi et al.: Flame Made Nanoparticles Permit Processing of Dense, Flexible, Li+ Conducting Ceramic Electrolyte Thin Films of Cubic-Li7La3Zr2O12 (c-LLZO), Journal of Materials Chemistry A, 2016, vol. 4, No. 33, pp. 12947-12954.

Zhang et al.: Porous Silicon Carbide Ceramics Produced by a Carbon Foam Derived from Mixtures of Mesophase Pitch and Si Particles, Journal of the American Ceramic Society, 2009, vol. 92, No. 1, pp. 260-263.

Zhao et al.: A Chemistry and Material Perspective on Lithium Redox Flow Batteries Towards High-Density Electrical Energy Storage, Chemical Society Reviews, 2015, vol. 44, No. 22, pp. 7968-7996.

* cited by examiner

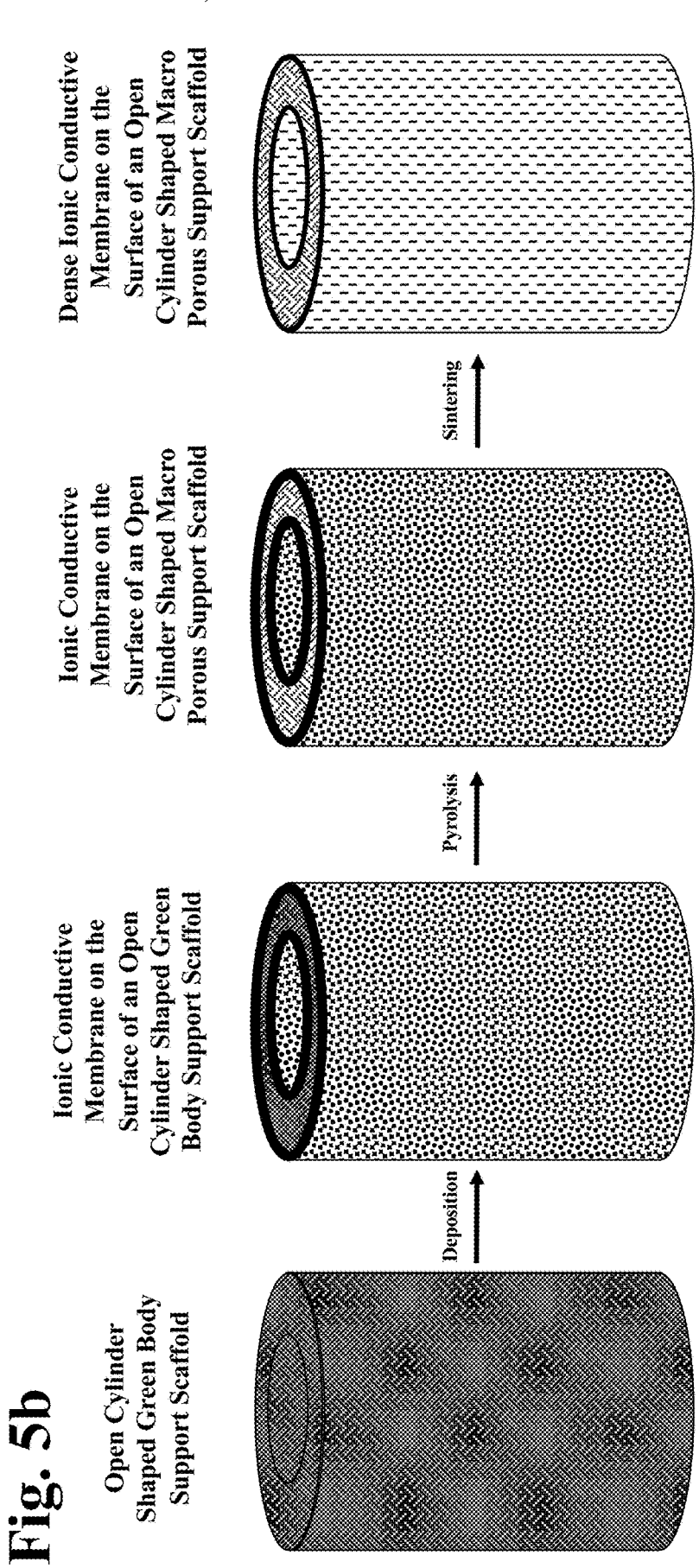

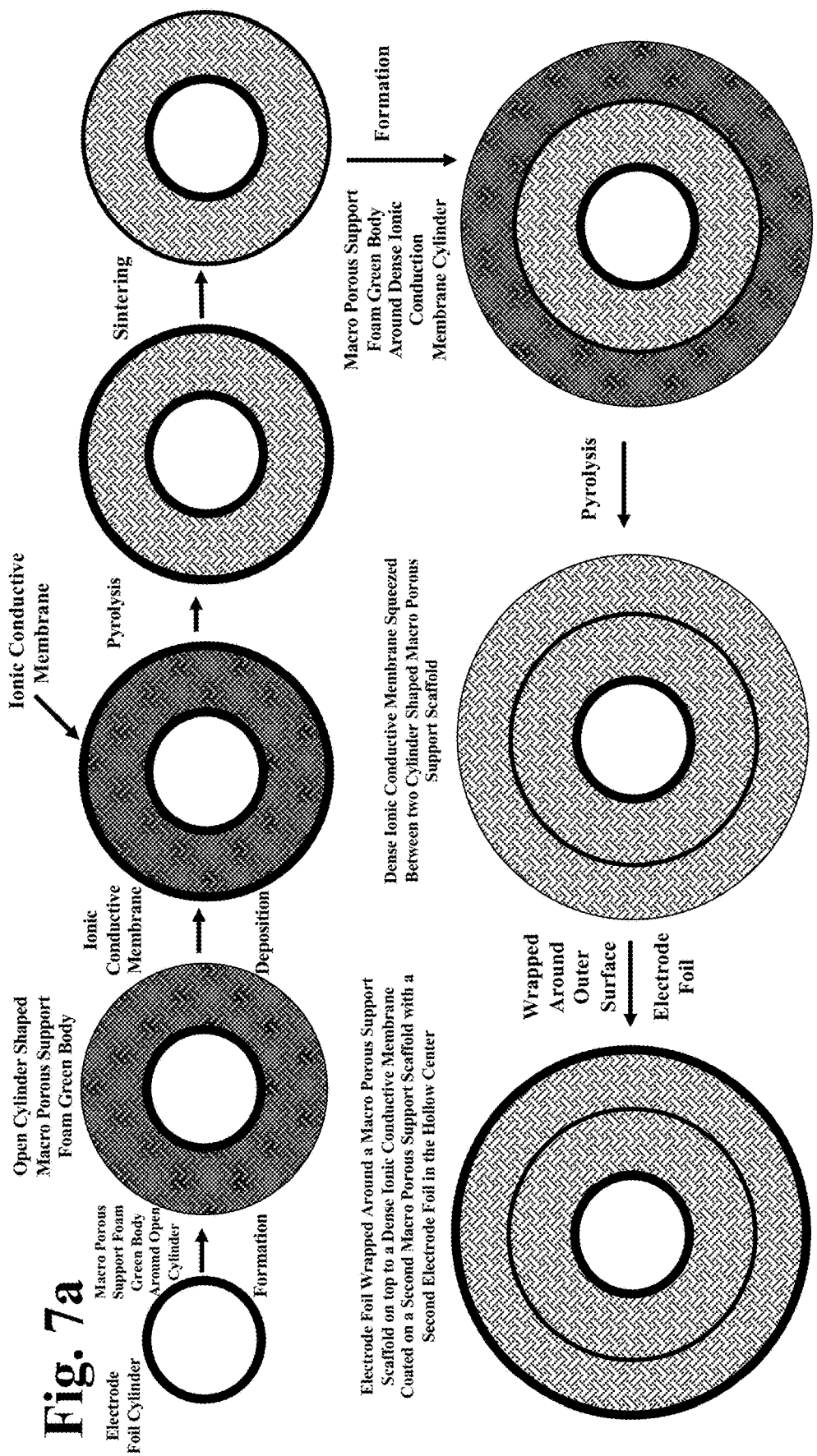

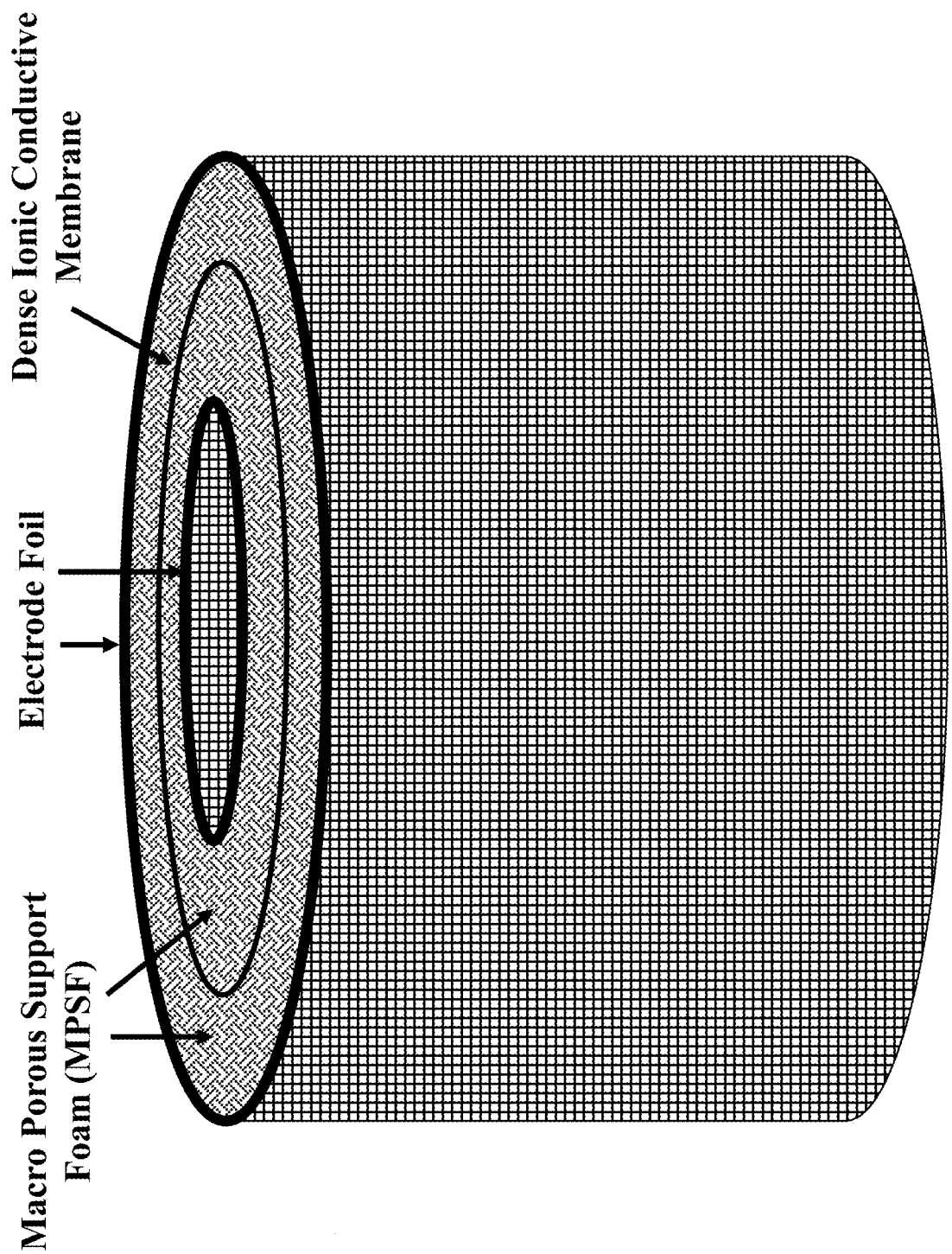

REDOX FLOW BATTERIES, COMPONENTS FOR REDOX FLOW BATTERIES AND METHODS FOR MANUFACTURE THEREOF

PRIORITY

The present invention claims the priority of U.S. Provisional Patent Application No. 62/745,510, filed Oct. 15, 2018, which is incorporated herein by reference in its entirety.

FIELD

The present application relates to the field of redox flow batteries, components for redox flow batteries, and methods for manufacturing components for redox flow batteries.

BACKGROUND

Redox flow batteries have been an emerging technology and energy back system for evolving smart grids. Redox flow batteries have an ion exchange membrane that allows for a charge balance across the system. However, current ion-exchange membranes are subject to crossover of the electrolytes which ultimately lowers the lifetime of the redox flow battery.

SUMMARY

To overcome the crossover issue associated with current ion-exchange membranes, thin solid state ionic conductive membranes have been proposed. However, the mechanical strength of these ionic conductive membranes is not enough to overcome the fluidic forces applied to the membrane during operation. To overcome this issue, macro porous support scaffolds can be used to help strengthen the ionic conductive membrane.

In an embodiment of the present disclosure, a redox flow battery includes a positive terminal, a negative terminal, and a solid state ionic conductive membrane on a macro porous support scaffold between the positive terminal and the negative terminal.

In another embodiment of the present disclosure, a method of using the redox flow battery includes flowing an electrolyte through the macro porous support scaffold and passing a ionic component of the electrolyte through the solid state ionic conductive membrane.

In yet another embodiment of the present disclosure, a component for a redox flow battery includes a solid state ionic conductive membrane on a macro porous support scaffold.

In yet another embodiment of the present disclosure, a method for manufacturing the component includes forming the solid state ionic conductive membrane on a support scaffold and treating the support scaffold to be macro porous.

Other embodiments of the disclosed redox flow battery, method of using the redox flow battery, component for a redox flow battery, and method for manufacturing the component will become apparent from the following detailed description, the accompanying drawings and the appended claims.

BRIEF DESCRIPTION OF THE DRAWINGS

According to an example of the present description.

According to an example of the present description.

According to an example of the present description.

According to an example of the present description.

According to an example of the present description.

According to an example of the present description.

According to an example of the present description.

According to an example of the present description.

According to an example of the present description.

According to an example of the present description.

According to an example of the present description.

According to an example of the present description.

According to an example of the present description.

According to an example of the present description.

According to an example of the present description, FIG. 5b is a three-dimensional schematic illustration of an open cylindrical shaped macro porous support scaffold with an ionic conductive membrane formed on the inner and outer surface of said macro porous support scaffold According to an example of the present description.

According to an example of the present description.

According to an example of the present description.

According to an example of the present description.

According to an example of the present description.

According to an example of the present description, FIG. 7a is a schematic illustration from a cross-sectional view of a cylindrical shaped electrode foil surrounded by an open shaped cylindrical macro porous with an ionic conductive membrane on its other surface. A second open shaped cylindrical macro porous support scaffold is formed around the ionic conductive membrane with a second electrode foil wrapped around the outer surface of the outer macro porous support scaffold.

According to an example of the present description.

According to an example of the present description, FIG. 7c is an artistic illustration of the final prototype outline in FIGS. 7a-b of a cylindrical shaped electrode foil surrounded by an open shaped cylindrical macro porous with an ionic conductive membrane on its other surface. A second open shaped cylindrical macro porous support scaffold is formed around the ionic conductive membrane with a second electrode foil wrapped around the outer surface of the outer macro porous support scaffold.

According to an example of the present description.

According to an example of the present description.

According to an example of the present description.

According to an example of the present description.

According to an example of the present description.

DETAILED DESCRIPTION

Figure 1A:
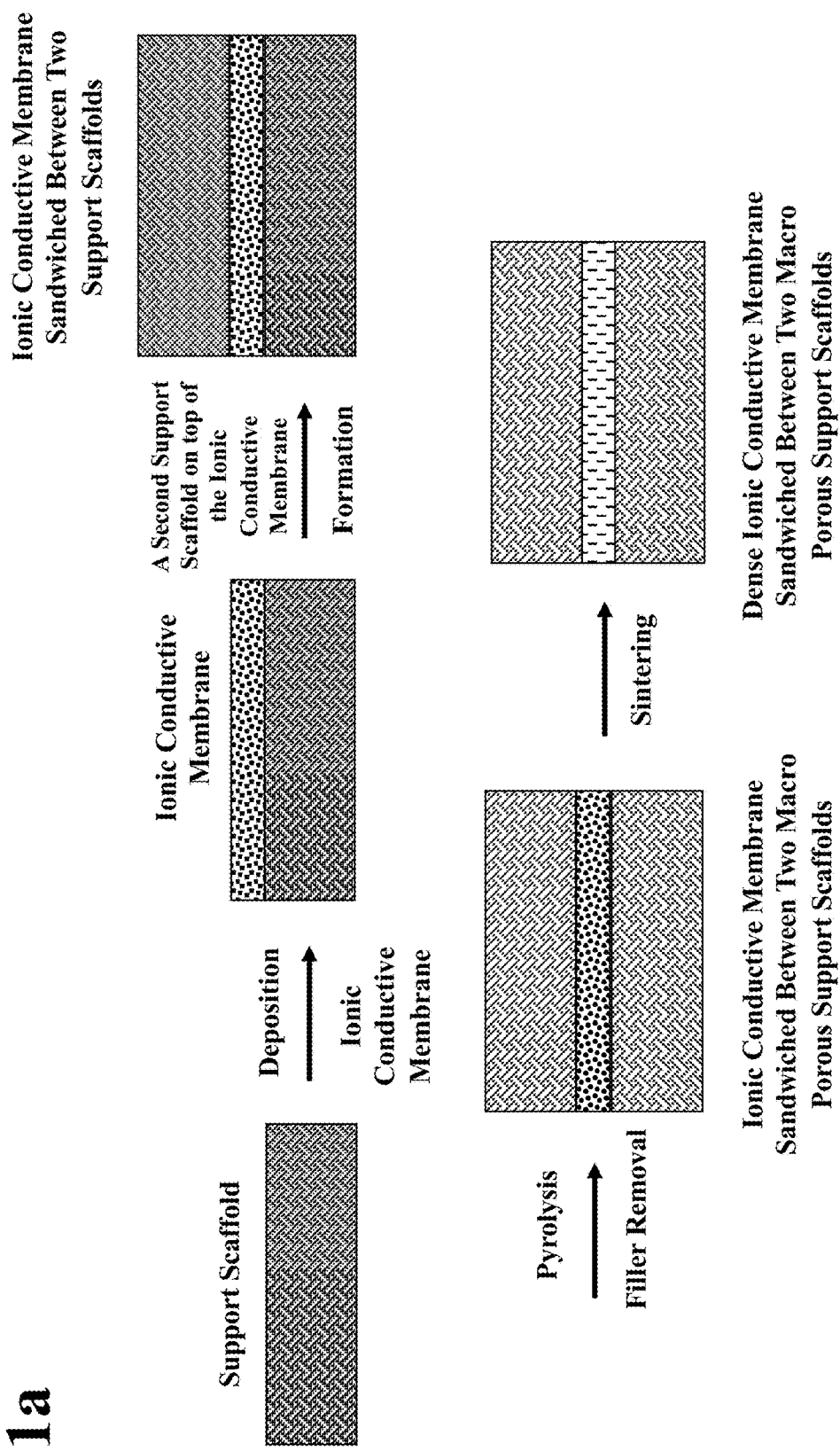
FIG. 1a is a schematic illustration of the formation of an ionic conductive membrane sandwiched between two macro porous support scaffolds.

To overcome the crossover issue associated with current ion-exchange membranes, thin solid state ionic conductive membranes have been proposed. However, the mechanical strength of these ionic conductive membranes is not enough to overcome the fluidic forces applied to the membrane during operation. To overcome this issue, macro porous support scaffolds of the present description can be used to help strengthen the ionic conductive membrane for use in redox flow batteries.

It would be understood that a redox flow batteries inherently includes a positive terminal and a negative terminal, which may take any form, as well as other typical components, such as, for example, suitable electrode materials, catholytes, anolytes, pumps, switches, connections to energy sources and energy loads, etc. The present description includes exemplary configurations of typical components of redox flow batteries, but it is understood that the present description is not limited to the specific illustrated configurations of the various components of redox flow batteries.

In an embodiment of the present disclosure, a redox flow battery includes a positive terminal, a negative terminal, and a solid state ionic conductive membrane on a macro porous support scaffold between the positive terminal and the negative terminal. The solid state ionic conductive membrane and the macro porous support scaffold may take a variety of forms as described below and as illustrated in the drawings.

In an embodiment of the present disclosure, a method of using the redox flow battery includes flowing an electrolyte of the redox flow battery through the macro porous support scaffold and passing a ionic component of the electrolyte through the solid state ionic conductive membrane. The method may include various additional steps as described below and as would be understood from the drawings.

In an embodiment of the present disclosure, a component for a redox flow battery includes a solid state ionic conductive membrane on a macro porous support scaffold. The component may take a variety of forms as described below and as illustrated in the drawings.

In an embodiment of the present disclosure, a method for manufacturing the component, includes forming the solid state ionic conductive membrane on a support scaffold and treating the support scaffold to be macro porous.

The method for manufacturing the solid state ionic conductive membrane may include any one or more of the following aspects, separately or in combination.

The step of forming the solid state ionic conductive membrane on the removable support substrate may include, for example, at least one of slurry sedimentation, spraying, dipping, filtration, pyrolysis, electroplating, plasma spray, thermal spray, fume spray, screen printing, tape casting, injection, chemical vapor deposition, physical vapor deposition, and sputtering.

The support scaffold may include a macro porous substrate pre-filled with a filler material, and the step of treating the support scaffold to be macro porous may include removing the filler material.

The macro porous substrate may include, for example, at least one of nickel foam, copper foam, carbon foam, silicon foam, silicon carbide, silicon nitride, aluminum nitride, alumina, and zirconia.

The filler material may include, for example, at least one of a salt, a resin, and a wax.

The step of removing the filler material may include, for example, at least one of dissolving the filler material and heating the filler material. Dissolving may include completely dissolving the filler material or partially dissolving (e.g., etching) the filler material.

The support scaffold may include a macro porous substrate pre-filled with a filler material, and the step of treating the support scaffold to be macro porous may include hardening the filler material and removing the macro porous substrate.

The filler material may include, for example, a polymer.

The step of hardening the filler material may include, for example, at least one of curing the filler material and drying the filler material.

The step of removing the macro porous substrate may include, for example, at least one of dissolving the macro porous substrate and heating the macro porous substrate. Dissolving may include completely dissolving the macro porous substrate or partially dissolving (e.g., etching) the macro porous substrate.

The support scaffold may include a solid green body, and the step of treating the support scaffold to be macro porous may include transforming the solid green body to a macro porous support scaffold.

The macro porous support scaffold may include, for example, at least one of silicon carbide, silicon nitride, zirconium dioxide, and aluminum oxide.

The method for manufacturing the solid state ionic conductive membrane may further include densifying the solid state ionic conductive membrane.

The step of densifying the solid state ionic conductive membrane may occur before, during, or after the step of treating the support scaffold to be macro porous.

The step of densifying the solid state ionic conductive membrane may include heat treating the solid state ionic conductive membrane.

The step of heat treating the solid state ionic conductive membrane may include sintering the solid state ionic conductive membrane.

The method for manufacturing the solid state ionic conductive membrane may further include any one or more of the following additional aspects, separately or in combination, together with any one or more of the previous aspects, as well as any one or more aspects illustrated in the drawings.

In the present disclosure, the term scaffold is used to describe a substrate with a macro porosity with pore size of greater than 50 nanometers, preferably pore size greater than 1 micron.

A solid state ionic conductive membrane includes or is formed from a solid state ionic conductive material. A solid state ionic conductive material can be described as a material that may have the following characteristics:

A solid state ionic conductive material is a type of solid state material that can selectively allow a specific charged element to pass through under the presence of an electric field or chemical potential, such as concentration differences.

While this solid state ionic conductive material allows ions to migrate through, it may not allow electrons to pass easily.

The ions may carry 1, 2, 3, 4 or more positive charges. Examples of the charged ions may include, but not limited to $H^+$, $Li^+$, $Na^+$, $K^+$, $Ag^+$, $Mg^{2+}$, $Zn^{++}$, etc.

The present disclosure outlines several methods to pre-fill a removable filler material into the support scaffolds in which an ionic conductive membrane can be built on top. Following the fabrication of the ionic conductive membrane, the filler can be removed leaving behind a macro porous support scaffold having pores of a size greater than 50 nanometers, preferably having pores of a size greater than 1 micron.

The ionic conductivity of the corresponding ions is preferred to have the conductivity of $>10^{-7}$ S/cm. It also may have lower electronic conductivity ($<10^{-8}$ S/cm).

The density of the processed membrane is preferred to have a porosity less than 15%, meaning the density should be bigger or equal to 85% of the theoretical density.

The thickness of the membrane may be in the range of $0<t<400$ μm, with a preferred range of 100 nm to 200 μm.

Examples of the ionic conductive material may include but not limited to a garnet like structure with the following compositions:

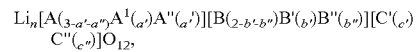
$$Li_n[A_{(3-a'-a'')}A^1{}_{(a')}A''{}_{(a'')}][B_{(2-b'-b'')}B'{}_{(b')}B''{}_{(b'')}][C'{}_{(c')}C''{}_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0\leq a'\leq 2$ and $0\leq a''\leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0\leq b'$, $0\leq b''$, and $b'-b''\leq 2$;

c. where C' and C" stand for a tetrahedral position of the crystal structure, i. where C' stands for one or more of Al, Ga, and boron, ii. where C" stands for one or more of Si and Ge, and iii. wherein $0\leq c'\leq 0.5$ and $0\leq c''\leq 0.4$; and d. wherein $n=7-a'+2\cdot a''-b'-2\cdot b''-3\cdot c'-4\cdot c''$ and $4.5\leq n\leq 7.5$.

In a first aspect of the ionic conductive membrane, A stands for one or more of La, Ce, Sc, Y, Pr, Nd, Sm, Eu, Gd, Tb, Dy, Ho, Er, Tm, and Yb.

In a second aspect of the ionic conductive membrane, A' stands for one or more of Mg, Ca, Sr, and Ba. The second aspect of the ionic conductive membrane may be combined with the first aspect of the ionic conductive membrane.

In a third aspect of the ionic conductive membrane, A' stands for Mg. The third aspect of the ionic conductive membrane may be combined with the first aspect of the ionic conductive membrane.

In a fourth aspect of the ionic conductive membrane, A' stands for one or more of Ca, Sr, and Ba. The fourth aspect of the ionic conductive membrane may be combined with the first aspect of the ionic conductive membrane.

In a fifth aspect of the ionic conductive membrane, A" stands for one or more of Na and K. The fifth aspect of the ionic conductive membrane may be combined with the first aspect of the ionic conductive membrane. Alternatively, the fifth aspect of the ionic conductive membrane may be combined with the second aspect of the ionic conductive membrane. Alternatively, the fifth aspect of the ionic conductive membrane may be combined with the third aspect of the ionic conductive membrane. Alternatively, the fifth aspect of the ionic conductive membrane may be combined with the fourth aspect of the ionic conductive membrane. Alternatively, the fifth aspect of the ionic conductive membrane may be combined with the first aspect and any one of the second, third, and fourth aspects.

In a sixth aspect of the ionic conductive membrane, B stands for one or more of Zr, Hf, and Sn. The sixth aspect of the ionic conductive membrane may be combined with the first aspect of the ionic conductive membrane. Alternatively, the sixth aspect of the ionic conductive membrane may be combined with the second aspect of the ionic conductive membrane. Alternatively, the sixth aspect of the ionic conductive membrane may be combined with the third aspect of the ionic conductive membrane. Alternatively, the sixth aspect of the ionic conductive membrane may be combined with the fourth aspect of the ionic conductive membrane. Alternatively, the sixth aspect of the ionic conductive membrane may be combined with the fifth aspect of the ionic conductive membrane. Alternatively, the sixth aspect of the ionic conductive membrane may be combined with the first aspect of the ionic conductive membrane and any one of the second, third, and fourth aspects. Alternatively, the sixth aspect of the ionic conductive membrane may be combined with the fifth aspect of the ionic conductive membrane and any one of the second, third, and fourth aspects. Alternatively, the sixth aspect of the ionic conductive membrane may be combined with the first aspect of the ionic conductive membrane, the fifth aspect, and any one of the second, third, and fourth aspects.

In a seventh aspect of the ionic conductive membrane, B' stands for one or more of Ta, Nb, Sb, V, and Bi. The seventh aspect of the ionic conductive membrane may be combined with the first aspect of the ionic conductive membrane. Alternatively, the seventh aspect of the ionic conductive membrane may be combined with the second aspect of the ionic conductive membrane. Alternatively, the seventh aspect of the ionic conductive membrane may be combined with the third aspect of the ionic conductive membrane. Alternatively, the seventh aspect of the ionic conductive membrane may be combined with the fourth aspect of the ionic conductive membrane. Alternatively, the seventh aspect of the ionic conductive membrane may be combined with the fifth aspect of the ionic conductive membrane. Alternatively, the seventh aspect of the ionic conductive membrane may be combined with the sixth aspect of the ionic conductive membrane. Alternatively, the seventh aspect of the ionic conductive membrane may be combined with any combination of two or more of the first aspect of the ionic conductive membrane, any one of the second, third, and fourth aspects, the fifth aspect, and the sixth aspect.

In an eighth aspect of the ionic conductive membrane, B" stands for one or more of Te, W, and Mo. The eighth aspect of the ionic conductive membrane may be combined with the first aspect of the ionic conductive membrane. Alternatively, the eighth aspect of the ionic conductive membrane may be combined with the second aspect of the ionic conductive membrane. Alternatively, the eighth aspect of the ionic conductive membrane may be combined with the third aspect of the ionic conductive membrane. Alternatively, the eighth aspect of the ionic conductive membrane may be combined with the fourth aspect of the ionic conductive membrane. Alternatively, the eighth aspect of the ionic conductive membrane may be combined with the fifth aspect of the ionic conductive membrane. Alternatively, the eighth aspect of the ionic conductive membrane may be combined with the sixth aspect of the ionic conductive membrane. Alternatively, the eighth aspect of the ionic conductive membrane may be combined with the seventh aspect of the ionic conductive membrane. Alternatively, the eighth aspect of the ionic conductive membrane may be combined with any combination of two or more of the first aspect of the ionic conductive membrane, any one of the second, third, and fourth aspects, the fifth aspect, the sixth aspect, and the seventh aspect.

In a ninth aspect of the ionic conductive membrane, C' stands for one or more of Al and Ga. The ninth aspect of the ionic conductive membrane may be combined with the first aspect of the ionic conductive membrane. Alternatively, the ninth aspect of the ionic conductive membrane may be combined with the second aspect of the ionic conductive membrane. Alternatively, the ninth aspect of the ionic conductive membrane may be combined with the third aspect of the ionic conductive membrane. Alternatively, the ninth aspect of the ionic conductive membrane may be combined with the fourth aspect of the ionic conductive membrane. Alternatively, the ninth aspect of the ionic conductive membrane may be combined with the fifth aspect of the ionic conductive membrane. Alternatively, the ninth aspect of the ionic conductive membrane may be combined with the sixth aspect of the ionic conductive membrane. Alternatively, the ninth aspect of the ionic conductive membrane may be combined with the seventh aspect of the ionic conductive membrane. Alternatively, the ninth aspect of the ionic conductive membrane may be combined with the eighth aspect of the ionic conductive membrane. Alternatively, the ninth aspect of the ionic conductive membrane may be combined with any combination of two or more of the first aspect of the ionic conductive membrane, any one of the second, third, and fourth aspects, the fifth aspect, the sixth aspect, the seventh aspect, and the eighth aspect.

In a tenth aspect of the ionic conductive membrane, C' stands for boron. The tenth aspect of the ionic conductive membrane may be combined with the first aspect of the ionic conductive membrane. Alternatively, the tenth aspect of the ionic conductive membrane may be combined with the second aspect of the ionic conductive membrane. Alternatively, the tenth aspect of the ionic conductive membrane may be combined with the third aspect of the ionic conductive membrane. Alternatively, the tenth aspect of the ionic conductive membrane may be combined with the fourth aspect of the ionic conductive membrane. Alternatively, the tenth aspect of the ionic conductive membrane may be combined with the fifth aspect of the ionic conductive membrane. Alternatively, the tenth aspect of the ionic conductive membrane may be combined with the sixth aspect of the ionic conductive membrane. Alternatively, the tenth aspect of the ionic conductive membrane may be combined with the seventh aspect of the ionic conductive membrane. Alternatively, the tenth aspect of the ionic conductive membrane may be combined with the eighth aspect of the ionic conductive membrane. Alternatively, the tenth aspect of the ionic conductive membrane may be combined with any combination of two or more of the first aspect of the ionic conductive membrane, any one of the second, third, and fourth aspects, the fifth aspect, the sixth aspect, the seventh aspect, and the eighth aspect.

In a specific aspect of the present description, there is an ionic conductive membrane including a garnet-like structure oxide material with the general formula:

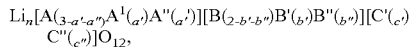

a. where A, A', and A" stand for a dodecahedral position of the crystal structure, i. where A stands for one or more of La, Y, Pr, Nd, Sm, Eu, Gd, Tb, Dy, Ho, Er, Tm, and Yb, where A' stands for one or more of Mg, Ca, Sr, and Ba, iii. where A" stands for one or more of Na and K, and iv. wherein $0 \leq a' \leq 2$ and $0 \leq a'' \leq 1$;

b. where B, B', and B" stand for an octahedral position of the crystal structure, i. where B stands for one or more of Zr, Hf, Ti and Sn, ii. where B' stands for one or more of Ta, Nb, Sb, V, and Bi, iii. where B" stands for one or more of Te, W, and Mo, and iv. wherein $0 \leq b'$, $0 \leq b''$, and $b'+b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n = 7 - a' + 2 \cdot a'' - b' - 2 \cdot b'' - 3 \cdot c' - 4 \cdot c''$ and $5.5 \leq n \leq 6.875$.

In another specific aspect of the present description, there is an ionic conductive membrane including a garnet-like structure oxide material with the general formula:

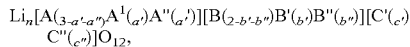

a. where A, A', and A" stand for a dodecahedral position of the crystal structure, i. where A stands for one or more of La, Y, Pr, Nd, Sm, Eu, Gd, Tb, Dy, Ho, Er, Tm, and Yb, where A' stands for one or more of Ca, Sr, and Ba, iii. where A" stands for one or more of Na and K, and iv. wherein $0 \leq a' \leq 2$ and $0 \leq a'' \leq 1$;

b. where B, B', and B" stand for an octahedral position of the crystal structure, i. where B stands for one or more of Zr, Hf, and Sn, ii. where B' stands for one or more of Ta, Nb, Sb, and Bi, iii. where B" stands for one or more of Te, W, and Mo, and iv. wherein $0 \leq b'$, $0 \leq b''$, and $b'+b'' \leq 2$;

c. where C' and C" stand for a tetrahedral position of the crystal structure, i. where C' stands for one or more of Al and Ga, ii. where C" stands for one or more of Si and Ge, and iii. wherein $0 \leq c' \leq 0.5$ and $0 \leq c'' \leq 0.4$; and d. wherein $n = 7 + a' + 2 \cdot a'' - b' - 2 \cdot b'' - 3 \cdot c' - 4 \cdot c''$ and $4.5 \leq n \leq 7.5$.

The garnet-like structure oxide material of the above-described ionic conductive membrane enables the following technical effects:

The garnet-like structure oxide material has high lithium ionic conductivity. In an aspect, the garnet-like structure oxide material has high lithium ionic conductivity at room temperature and/or reasonable elevated temperature.

The garnet-like structure oxide material is stable with respect to a lithium-rich electrolyte on both sides of the membrane.

The garnet-like structure oxide material is stable in at least some acidic or basic conditions.

The above-described ionic conductive membrane according to any combination of one of more aspects of the first embodiment of the present description is not limited by structural design of the membrane.

In an aspect, the membrane includes a macro porous support scaffold and the garnet-like structure oxide material is disposed on the macro porous support scaffold.

Other optional aspects of the structural design of the membrane will be apparent from the remainder of the present description. For example, the structural design used for the above-described ionic conductive membrane including the garnet-like structure oxide material may have one or more of the following characteristics:

The ionic conductive membrane is chemically compatible with the macro porous support scaffold and any materials used in its formation.

The ionic conductive membrane is chemically compatible with any interface layers and materials used in its formation.

The ionic conductive membrane is chemically compatible with lithium metal.

The ionic conductive membrane is chemically compatible with any electrode material deposited along the surface of the macro porous support scaffold.

The ionic conductive membrane meets mechanical strength requirements to withstand the forces applied during functioning of the redox flow battery while supported on the macro porous support scaffold.

The ionic conductive membrane is dense enough to prevent leak of liquid therethrough or crossover of liquids from side one to side two or from side two to side one.

The ionic conductive membrane is chemically inert to the liquid media it is exposed to, thus to avoid chemical corrosion and erosion during operation and over time.

A material used for the ionic conductive membrane may have one or more of the following characteristics.

An ionic conductive membrane is non-electrically conductive.

An ionic conductive membrane is chemically stable in an aqueous or non-aqueous solution.

An ionic conductive membrane is stable in some acidic or basic solution.

An ionic conductive membrane is selective only to lithium ions.

An ionic conductive membrane may require further thermal treatment for densification purposes.

An ionic conductive membrane may have a low porosity prior to sintering.

An ionic conductive membrane must be a continuous layer that is flat and uniform as to allow electrical current to distribute evenly.

This present description further relates to structural designs of the macro porous support substrate that supports an ionic conductive membrane as a solid-state membrane for a lithium based redox flow battery.

This present description further relates to structural designs of the macro porous scaffold.

A support scaffold may be described as a green body of a potential porous foam material. Through means of pyrolysis the green body maybe converted to a macro porous support scaffold. Examples of green body material may include, but not limited to, silicon carbide, silicon nitride, zirconium oxide, aluminum oxide, etc.

An example of green body support scaffold includes using a highly cross-linked hybrid organic-inorganic polymer resin matrix composed of polycarosilane, diisocyanates and an epoxy resin to prepare a silicon carbide foam. Typically, the resulting hybrid matrix is heated, and a subsequent pyrolysis yields an open cell silicon carbide foam. Before the pyrolysis process, the ionic conductive membrane can be built on the surface of the hybrid matrix. After the ionic conductive membrane is built, then the pyrolysis can yield the open cell silicon carbide foam. In essence, the silicon carbide foam is the macro porous support scaffold.

In an aspect, the green body support scaffold can be formed with in a mold to form the desired shape of the macro porous support scaffold. Shape examples include, but not limited to, planar, cylinder, tubular, cubic, etc.

Alternatively, the voids of a macro porous support scaffold can be temporary filled with a pre-filling material to form a support scaffold. The surface of the pre-filled support scaffold can be sanded or smoothed to provide a flat surface one or both sides. The ionic conductive membrane can then be formed on the smooth surface(s). Once the ionic conductive membrane is formed the pre-filling material can be removed. The ionic conductive membrane can then be sintered. Alternatively, the ionic conductive membrane may be sintered followed by the removal of the pre-filling material given that the pre-filling material can withstand the sintering temperature.

Examples of macro porous support scaffolds may include, but not limited to nickel foam, copper foam, carbon foam, silicon carbide, graphene foam, etc.

In an aspect, a filling method involves placing a macro porous support scaffold in a saturated salt solution followed by the removal of the water through evaporation leaving the macro porous voids filled with a solid salt. After the ionic conductive membrane is built on top, the ionic conductive membrane can be sintered. After sintering the ionic conductive membrane can be placed in fresh water as to remove or dissolve the salt filler away.

Temporary salt fillers may include, but not limited to halide, sulfate, nitrate, hydroxide, oxide, sulfide, carbonate, nitrite, acetate, citrate, cyanide, phosphate, etc.

In an aspect, a filling method may involve the filling the voids of a macro porous support scaffold with a resin followed by curing. After the ionic conductive membrane is built on top, the resin can be removed by placing the ionic conductive membrane in an aqueous or non-aqueous solvent.

Temporary resins fillers may include, but limited to polyesters, epoxies, polyurethanes and silicones.

Temporary resin fillers may be deposited onto the macro porous support scaffold by means of, but not limited to, spin coating, drop casting, dipping, etc.

In an aspect, a filling method may involve filling the voids of a macro porous support structure with hot wax, which can be allowed to cool and harden. After the ionic conductive membrane is built on top, the hardened wax can be removed by applying heat to liquefy the wax. The macro porous support scaffold and be pulled quickly from the molten wax and further washed in a hot non-polar or organic solvent to remove residual wax.

Temporary wax fillers may include, but not limited to, animal waxes, plant waxes, mineral waxes, and petroleum waxes.

A material used for the macro porous support scaffold may have one or more of the following characteristics.

The macro porous support scaffold must be chemically compatible with the ionic conductive membrane.

The macro porous support scaffold must either be compatible with any sintering of the ionic conductive membrane.

The macro porous support scaffold can withstand any conditions it is exposed and any materials it is subjected to during the formation of the ionic conductive membrane.

The macro porous support scaffold is chemically compatible with any electrode foil used in the structural design.

The macro porous support scaffold is chemically compatible with any electrode material conformally deposited along its surface.

The macro porous support scaffold meets mechanical strength requirements to withstand the forces applied used in a redox battery flow system.

The macro porous support scaffold may be electrically conductive, semi electrically conductive or non-electrically conductive.

The macro porous support scaffold is chemically stable in an aqueous or non-aqueous solution.

The macro porous support scaffold may be stable in an acidic or basic solution.

The macro porous support scaffold is not selective to lithium ions or any other metals, liquids, gases, or ions.

This present description further relates to structural designs of the interface layer between lithium metal and an ionic conductive membrane in a semi flow battery design.

This present description further relates to structural designs of an interface layer.

An interface layer may be positioned between the ionic conductive membrane and a lithium metal electrode.

An interface layer may be built onto the surface of the ionic conductive membrane. Alternatively, the interface layer may be built onto the surface of the lithium metal electrode.

The thickness of the interface layer is not defined, but preferably it will be no thicker than 10 nanometers.

The interface layer may be built with traditional methods such as, but not limited to, slurry, sedimentation, spraying, dipping, filtration, pyrolysis, electroplating, plasma spray, thermal spray, injection, chemical vapor deposition, physical vapor deposition and sputtering.

A material used for an interface layer may have one or more of the following characteristics.

The interface layer is chemically compatible with the ionic conductive membrane.

The interface layer is chemically compatible with the macro porous support scaffold.

The interface layer is chemically compatible with any electrode foil or deposited electrode material used in the structural design.

The interface layer is chemically compatible with a lithium metal electrode.

The interface layer meets the mechanical strength requirements to withstand the forces applied during the operation of a redox flow battery.

The interface layer is chemically stable in an aqueous or non-aqueous solution.

The interface layer may be stable in an acidic or basic solution.

This present description further relates to structural designs of the electrode foil used in the specified designs.

The electrode foil may be a current collector with a thin film deposited on top as the electrode, alternatively the electrode foil may act as both the electrode and a current collector.

An electrode material may be built on top of a current collector with traditional methods such as, but not limited to, slurry, sedimentation, spraying, dipping, filtration, pyrolysis, electroplating, plasma spray, thermal spray, injection, chemical vapor deposition, physical vapor deposition and sputtering.

A material used for the electrode foil may have one or more of the following characteristics.

The electrode foil is chemically compatible with the ionic conductive membrane.

The electrode foil is chemically compatible with the macro porous support scaffold.

The electrode foil is chemically compatible with any electrode material conformally deposited along the surface of the macro porous support scaffold.

The electrode foil meets the mechanical strength requirements to withstand any of the applied forces during the operation of a redox battery flow.

The electrode foil is electrically conductive.

The electrode foil is chemically stable in an aqueous or non-aqueous solution.

The macro porous support scaffold may be stable in an acidic or basic solution.

The macro porous support scaffold is selective to lithium ions only and no other metals, liquids, gases, or ions.

This present description further relates to any conformally deposited electrode material along the surface of the macro porous support scaffold in the described structural designs for a lithium based redox flow battery.

The electrode material may be conformally deposited directly onto the macro porous support scaffold. Alternatively, in the event that the macro porous support scaffold is nonconductive, a thin conductive layer may be built on top of the scaffold to act as a current collector. The electrode material may then be conformally deposited directly onto the coated current collector.

An electrode material and/or current collector may be built on top of a macro porous support scaffold with traditional methods such as, but not limited to, slurry, sedimentation, spraying, dipping, filtration, pyrolysis, electroplating, plasma spray, thermal spray, injection, chemical vapor deposition, physical vapor deposition and sputtering.

A material used for the conformally deposited electrode material may have one or more of the following characteristics.

The deposited electrode material is chemically compatible with the ionic conductive membrane.

The deposited electrode material is chemically compatible with the macro porous support scaffold.

The deposited electrode material meets the mechanical strength requirements to withstand the forces applied used in a redox battery flow system.

The deposited electrode material may be electrically conductive, semi electrically conductive or non-electrically conductive.

The deposited electrode material is chemically stable in an aqueous or non-aqueous solution.

The deposited electrode material may be stable in an acidic or basic solution.

The deposited electrode material is selective to lithium ions only and no other metals, liquids, gases, or ions.

In another example, an ionic conductive membrane includes perovskite-type oxides such as $(Li,La)TiO_3$ or doped or replaced compounds.

In yet another example, an ionic conductive membrane includes NASICON-structured lithium membrane, such as LAGP ($Li_{1+x}Al_xGe_{2-x}(PO_4)_3$), LATP ($Li_{1+x}Al_xTi_{2-x}(PO_4)_3$) and these materials with other elements doped.

In yet another example, an ionic conductive membrane includes anti-perovskite structure materials.

In yet another example, an ionic conductive membrane includes $Li_3YH_6$ (H=F, Cl, Br, I) family of materials, Y can be replaced by other rare earth elements.

The present disclosure relates to an ionic conductive membrane built on and supported by a macro porous support scaffold and to the fabrication thereof.

The thickness of the membrane may be in the range of $0<t<400$ μm, with a preferred range of 100 nm to 200 μm.

The macro porous support scaffold may be a porous substrate pre-filled with removable filler. The pore size ranges 1 micron or bigger. After the formation of the ionic conductive membrane, the pre-filling material may be removed, such as by dissolving or through heat treatment. Examples of potential porous substrates may include, but not limited to, nickel foam, copper foam, carbon foam, silicon foam, silicon carbide, silicon nitride, aluminum nitride, alumina, zirconia, etc.

In yet another embodiment, the macro porous support scaffold may be a solid green body of a supporting material with a flat surface which can be further treated after the formation of the ionic conductive membrane to provide the macro porous scaffold. Examples of potential green bodies may include, but not limited to, silicon carbide, silicon nitride, zirconium dioxide, aluminum oxide, etc.

The macro porous support scaffold may be a porous substrate pre-filled with removable filler. The pore size ranges 1 micron or bigger. After the formation of the ionic conductive membrane, the pre-filling material may be removed, such as by means of dissolving or through heat treatment. Examples of potential porous substrates may include, but not limited to, nickel foam, copper foam, carbon foam, silicon foam, silicon carbide, silicon nitride, aluminum nitride, alumina, zirconia, etc.

In yet another embodiment, a polymer matrix may be used to fill the macro porous support scaffold. After curing and preparation, the ionic conductive membrane may be built on top. The macro porous scaffold can then be removed leaving the negative imprint of the polymer matrix which acts as the new macro porous support scaffold.

In yet another embodiment, the macro porous support scaffold may have the shape of, but not limited to, planar, tubular, cylinder, etc.

This present description further relates to structural designs of the ionic conductive membranes on a pre-filled macro porous scaffold.

A structural design for ionic conductive membranes has the following characteristics.

The ionic conductive membrane may be chemically stable with the removable filler.

The ionic conductive membrane may be chemically stable with the macro porous support scaffold.

The ionic conductive membrane may meet mechanical strength requirements to withstand the forces applied during removal of the removable filler.

The ionic conductive membrane may be chemically inert to any liquid media it is exposed to during the removal of the removable filler, thus to avoid chemical corrosion and erosion.

The ionic conductive membrane may need to withstand any applied temperature that it is exposed to for the purposes of removing the removable filler.

The ionic conductive membrane may be generally planar with some exceptions where the pre-filled supporting scaffold might happen to be non-planar.

A material used for the ceramic membrane may have one or more of the following characteristics.

An ionic conductive membrane may be electrically conductive, semi electrically conductive or non-electrically conductive.

An ionic conductive membrane may be chemically stable in an aqueous or non-aqueous solution.

An ionic conductive membrane may be stable in an acidic or basic solution.

An ionic conductive membrane may require further thermal treatment for densification purposes.

An ionic conductive membrane may have a low porosity prior to sintering, may be >25% or more.

An ionic conductive membrane may have a high or low tensile strength within reason.

An ionic conductive membrane is preferably to be a continuous layer that is flat and uniform as to allow electrical current to distribute evenly.

This present description further outlines the requirements of the macro porous scaffold.

The macro porous support scaffold is preferably to be chemically compatible with the ionic conductive membrane.

The macro porous support scaffold is preferably to be either compatible with the sintering temperature of the ionic conductive membrane or capable of withstanding a reasonable temperature to partially densify the ionic conductive membrane.

The macro porous support scaffold is preferably to be stable with any solutions or materials used to build the ionic conductive membrane.

The macro porous support scaffold may need to withstand any conditions it is exposed to during the formation of the ionic conductive membrane.

The macro porous support scaffold may need to withstand the sintering temperatures that is required for the ionic conductive membrane unless stated.

The macro porous support scaffold may be chemically compatible with the removable filler substance.

The macro porous support scaffold is preferably to be chemically compatible with any solutions used to remove the removable filler.

The macro porous support scaffold may need to meet mechanical strength requirements to withstand the forces applied during removal of the removable filler.

The macro porous support scaffold may be generally planar with some exceptions where the macro porous support scaffold might happen to be non-planar.

The macro porous support scaffold is preferably to be able to withstand any applied temperature that is required for the removal of the removable filler.

The macro porous support scaffold may be electrically conductive, semi electrically conductive or non-electrically conductive.

The macro porous support scaffold may be chemically stable in an aqueous or non-aqueous solution.

The macro porous support scaffold may be stable in an acidic or basic solution.

The macro porous support scaffold may not be selective to any metals, liquids, gases, or ions.

This present description further outlines the requirements of the removable filler.

The removable filler may be chemically stable with the ionic conductive membrane.

The removable filler is preferably to be stable with any solutions or materials used to build the ionic conductive membrane.

The removable filler is preferably to be able to withstand any temperature it is exposed to during the formation of the ionic conductive membrane.

The removable filler may need to withstand any conditions it is exposed to during the formation of the ionic conductive membrane.

The removable filler is preferably to be either be compatible with the sintering temperature of the ionic conductive membrane or capable of withstanding a reasonable temperature to partially densify the ionic conductive membrane.

The removable filler may be chemically stable with the macro porous support scaffold.

The removable filler may be chemically stable with any solution it is subjected to for the exception of any solution used for its removal.

The removable filler can fit into or fill in the voids of the macro porous support scaffold.

The removable filler can be removed by means it is subjected to.

In an example, an ionic conductive membrane supported by a macro porous support scaffold may be designed to be incorporated into an already existing redox flow battery.

In another example, an ionic conductive membrane supported by a macro porous support scaffold may be designed to be in a newly developed redox flow battery.

With reference to the drawings, methods for forming an ionic conductive membrane on a pre-filled macro porous scaffold may include one of the following.

In an aspect, a filler is used to temporarily fill the voids in the macro porous support scaffold. One side of the pre-filled macro porous support scaffold may be sanded or grounded down as to provide a smooth surface. The ionic conductive membrane can be built on top of the smooth surface. After the ionic conductive membrane is constructed the filler is then removed.

Macro porous support scaffolds may include, but not limited to nickel foam, copper foam, carbon foam, silicon foam, silicon carbide, silicon nitride, aluminum nitride, alumina, zirconia, etc.

An example of a filling method includes, but is not limited to, placing the porous support structure in a saturated salt solution followed by the removal of the water through evaporation leaving the voids filled with a solid salt. After the ionic conductive membrane is built on top, the ionic conductive membrane can be thermally treated or sintered for densification purposes. After sintering the ionic conductive membrane can be placed in fresh water as to remove or dissolve the salt filler away. On the other hand, the filler can be removed before sintering process.

Removable salt fillers may include, but not limited to halide, sulfate, nitrate, hydroxide, oxide, sulfide, carbonate, nitrite, acetate, citrate, cyanide, phosphate, etc.

Another example of a filling method includes, but not limited to filling the voids of the macro porous support structure with a resin followed by curing. After the ionic conductive membrane is built on top, the resin can be removed by placing the ionic conductive membrane in an aqueous or non-aqueous solvent.

Removable resins fillers may include, but limited to polyesters, epoxies, polyurethanes and silicones.

Removable resin fillers may be deposited onto the macro porous support scaffold by means of, but not limited to spraying, spin coating, drop casting, dipping, etc.

Another example of a filling method includes, but not limited to, filling the voids of the macro porous support structure with hot wax, which can be allowed to cool and harden. After the ionic conductive membrane is built on top, the harden wax can be removed by applying heat to liquify the wax. The macro porous support scaffold and be pulled quickly from the molten wax and further washed in a hot nonpolar or organic solvent to remove residual wax.

Removable wax fillers may include, but not limited to, animal waxes, plant waxes, mineral waxes, and petroleum waxes.

In an aspect, a liquid polymer is used to fill the voids of the macro porous support scaffold followed by curing or drying. One side of the porous support structure may be sanded or grounded down after filling to provide a smooth surface. The ionic conductive membrane is built on top of the smooth surface. After the ionic conductive membrane is constructed the macro porous support structure is removed, thus leaving the negative imprint of the polymer structure as the new macro porous support scaffold.

Polymers may include, but not limited to, polydimethylsiloxane (PDMS), polyvinylidene difluoride (PVDF), or polyethylene terephthalate (PETE). Although PDMS is preferred owing to its higher temperature resistance and chemical capability.

An example of polymer filling method includes, but not limited to; filling the voids of a nickel foam support scaffold with polydimethylsiloxane followed by curing. After the ionic conductive membrane is built on top, the nickel foam is etched away by placing the ionic conductive membrane in a weak acid solution such as hydrochloric acid or nitric acid.

Another example of a polymer filling method includes, but not limited to; filling the voids of a copper foam are filled with polydimethylsiloxane followed by curing. After the ionic conductive membrane is built on top, the copper foam is dissolved away by placing the ionic conductive membrane in a mixture of hydrogen peroxide and hydrochloric acid.

Another example of a polymer filling method includes, but not limited to; filling the voids of a carbon foam with polydimethylsiloxane followed by curing. After the ionic conductive electrolyte is built on top, the carbon foam is removed by heating the ionic conductive membrane to a temperature no lower than 100 degrees centigrade and no higher than 400 degrees centigrade in the presence of oxygen. The heating serves the purposes of densification of the ionic conductive membrane and decomposition of the carbon foam.

In an aspect, an ionic conductive membrane can be built on a macro porous support scaffold forming green body followed by co-pyrolysis processing.

An example of a macro porous support scaffold forming green body method includes, but not limited to; using a highly crosslinked hybrid organic-inorganic polymer resin matrix composed of polycarosilane, diisocyanates and an epoxy resin to prepare a silicon carbide foam. Typically, the resulting hybrid matrix is heated, and a subsequent pyrolysis yields an open cell silicon carbide foam. Before the pyrolysis process, the ionic conductive membrane can be built on the surface of the hybrid matrix. After the ionic conductive membrane is built, then the pyrolysis can yield the open cell silicon carbide foam. In essence, the silicon carbide foam is the macro porous support scaffold, however, instead of filling the voids of the silicon carbide, the green body structure of the foam prior to pyrolysis acts as both a macro porous support scaffold and a removable filler.

In an aspect, the ionic conductive membrane may be partially sintered at a lower temperature for a shorter time or fully sintered at a lower temperature for a longer time as to allow the filling substance to stay intact until a ionic conductive membrane is stable.

In an aspect, the ionic conductive membrane may be built with traditional slurry sedimentation, spraying, dipping, filtration, pyrolysis, electroplating, plasma spray, thermal spray, injection, chemical vapor deposition, physical vapor deposition and sputtering. These processes can be followed by heat treatment to densify the ionic conductive layer.

The above described methods can be ascribed to the formation of ionic conductive membrane on a macro porous support scaffold for applications that require a ionic conductive membrane where the ionic conductive membrane requires additional support for enhancing the mechanical strength from a macro porous support scaffold.

The drawings of the present disclosure further described examples of systems and methods for solid state ionic conductive membranes on macro porous support scaffolds for redox flow batteries.

FIG. 1a: A schematic illustration of the formation of an ionic conductive membrane sandwiched between two macro porous support scaffolds.

Figure 1B:
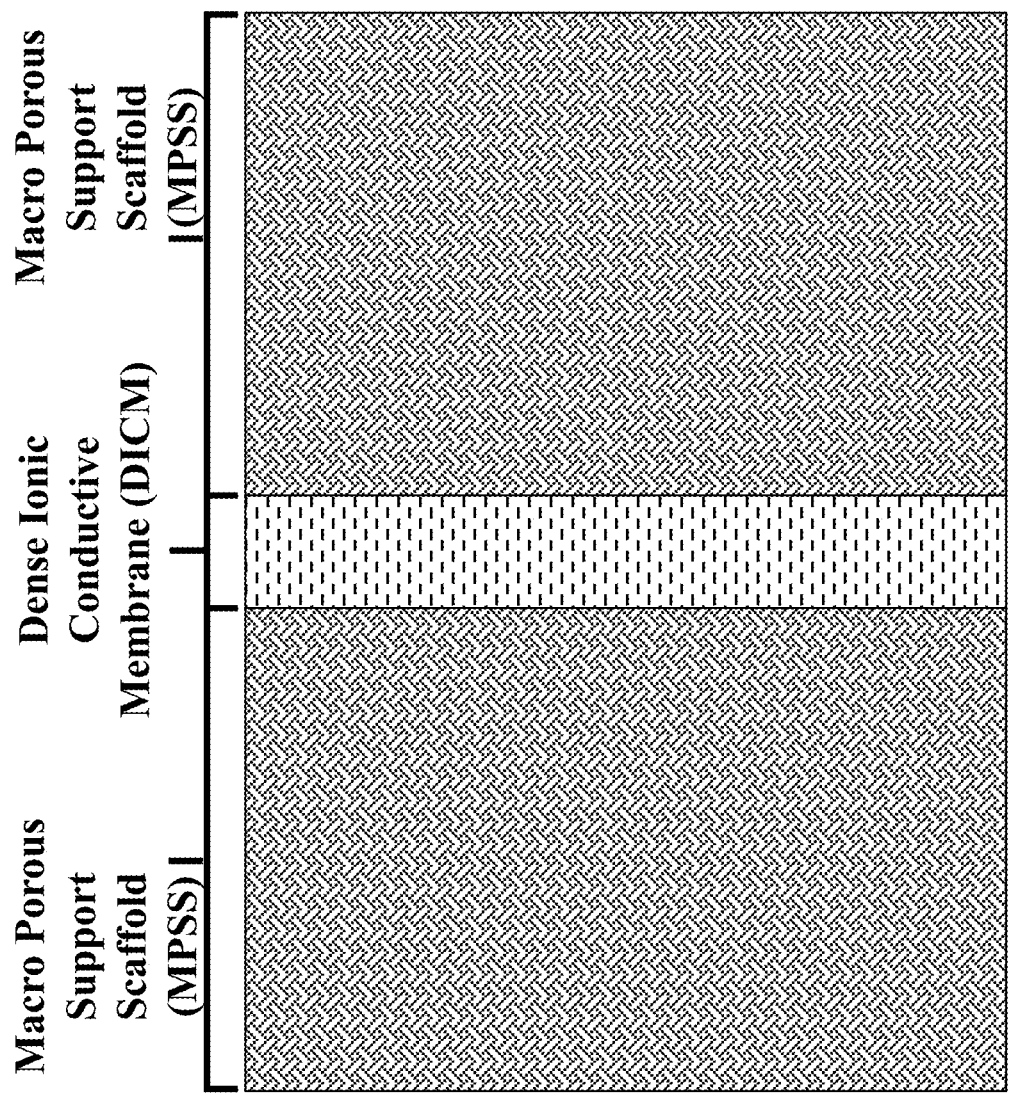
FIG. 1b is an artistic illustration of the final prototype outlined in FIG. 1a of an ionic conductive membrane sandwiched between two macro porous support scaffolds.

FIG. 1b: An artistic illustration of the final prototype outlined in FIG. 1a of an ionic conductive membrane sandwiched between two macro porous support scaffolds.

Figure 1C:
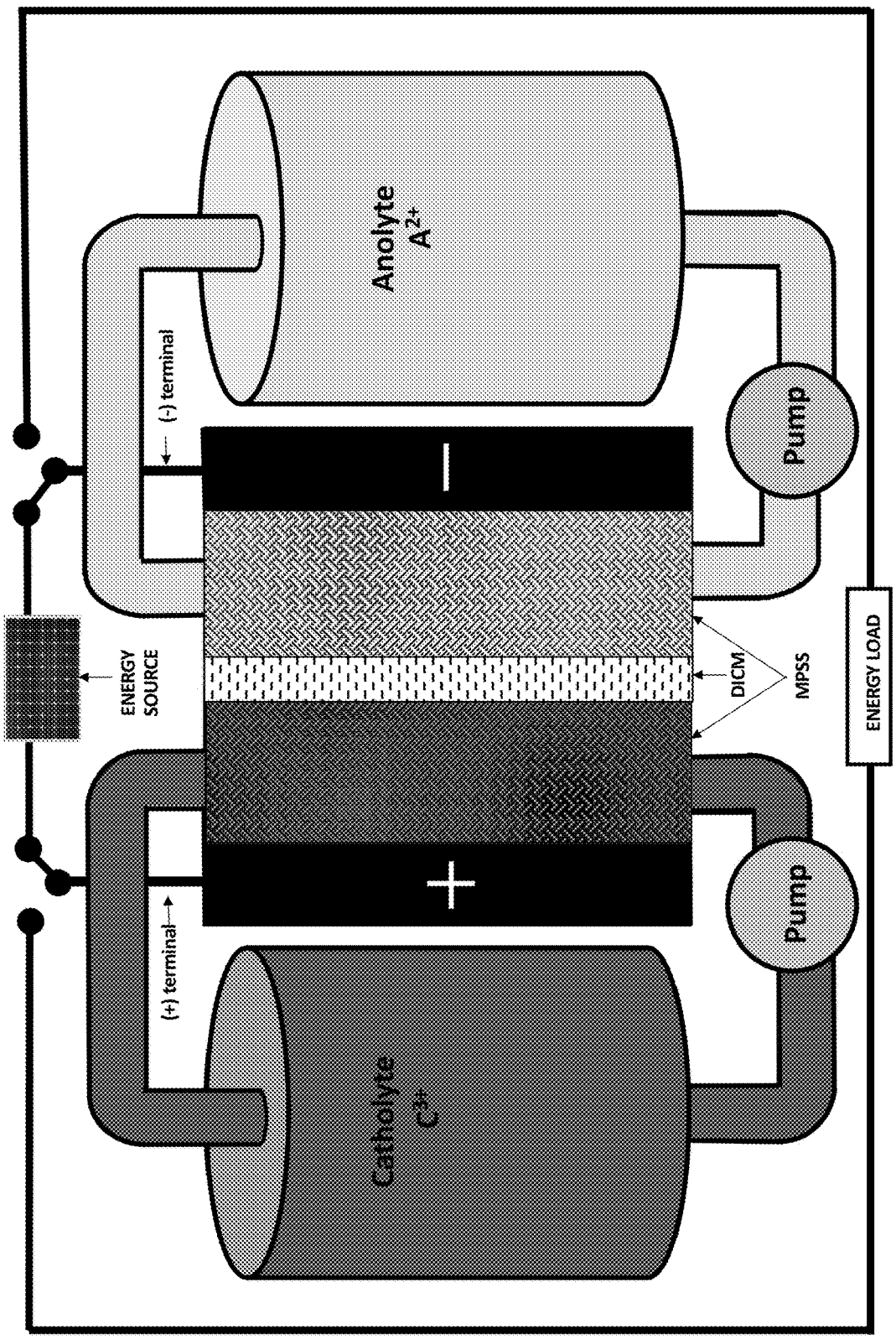
FIG. 1c is a representation of an exemplary redox flow battery including the example of FIG. 1b.

FIG. 1c: A representation of an exemplary redox flow battery including the example of FIG. 1b.

Figure 2A:
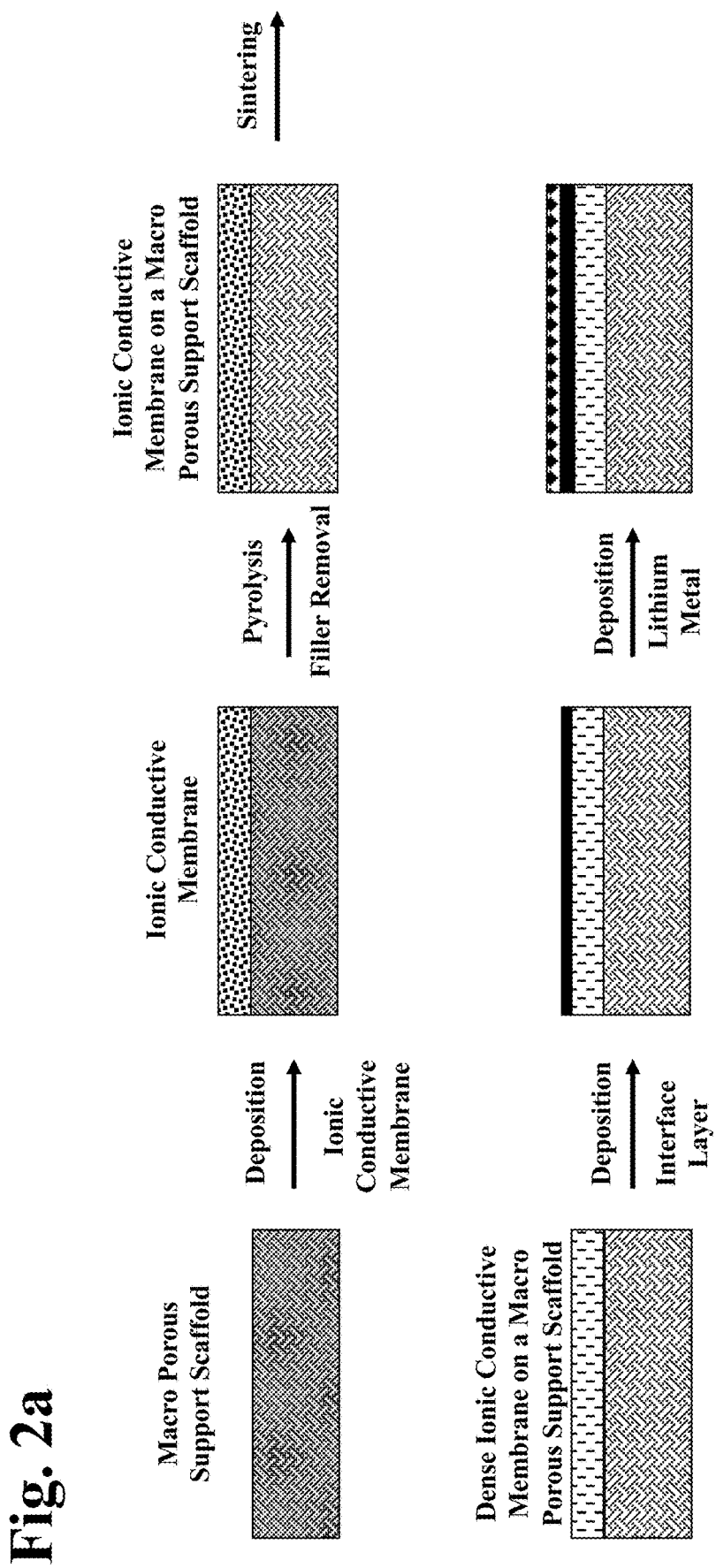
FIG. 2a is a schematic illustration of an ionic conductive membrane formed on a macro porous support scaffold. After the formation of the ionic conductive membrane, an ultra-thin interface layer followed by a lithium film deposited on top of the ionic conductive membrane.

FIG. 2a: A schematic illustration of an ionic conductive membrane formed on a macro porous support scaffold. After the formation of the ionic conductive membrane, an ultra-thin interface layer followed by a lithium film deposited on top of the ionic conductive membrane.

Figure 2B:
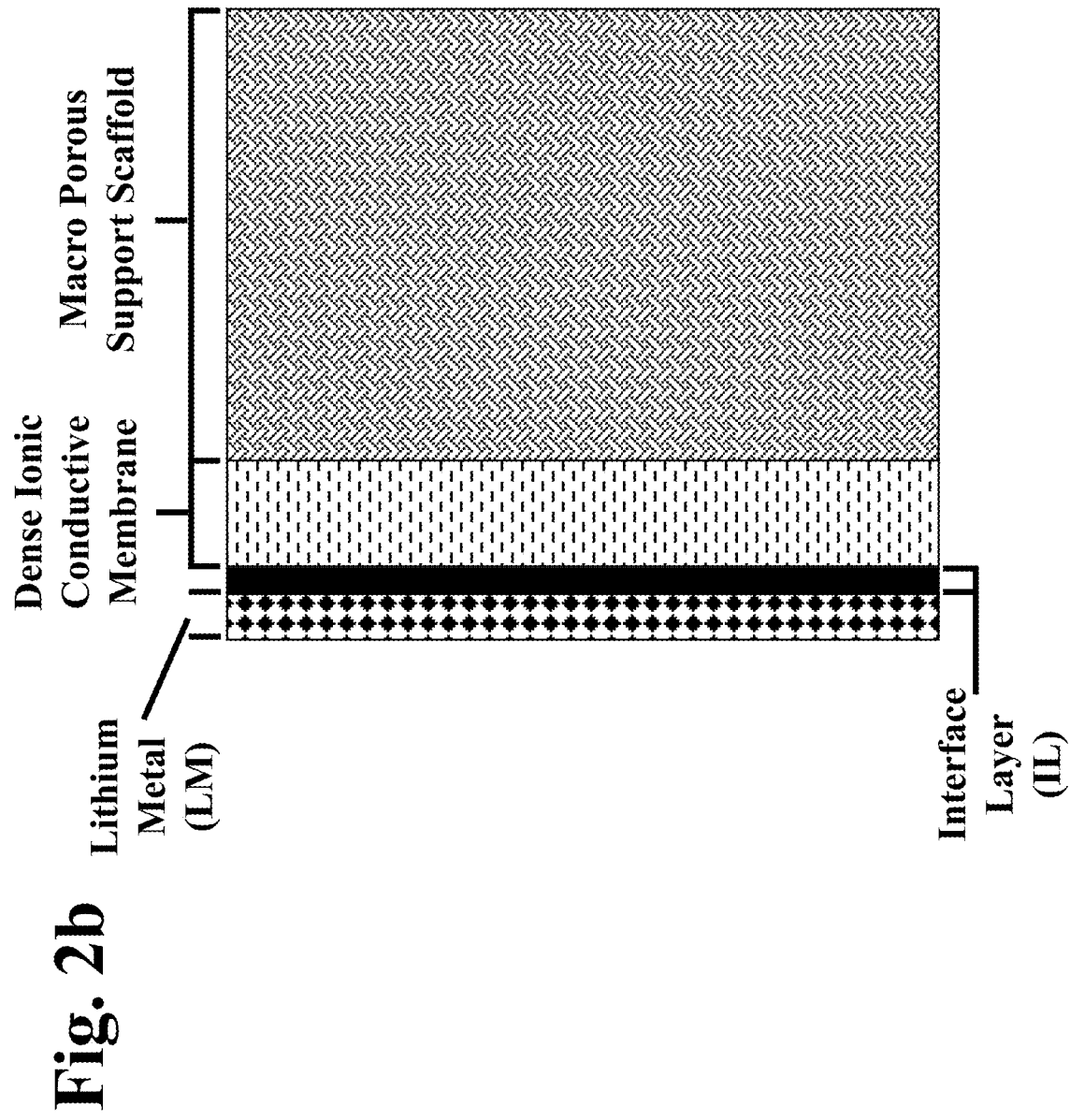
FIG. 2b is a schematics illustration of the final prototype outlined in FIG. 2a of an ultra-thin layer of a lithium film and an interface layer on top of an ionic conductive membrane formed on top of a macro porous support scaffold.

FIG. 2b: A schematics illustration of the final prototype outlined in FIG. 2a of an ultra-thin layer of a lithium film and an interface layer on top of an ionic conductive membrane formed on top of a macro porous support scaffold.

Figure 2C:
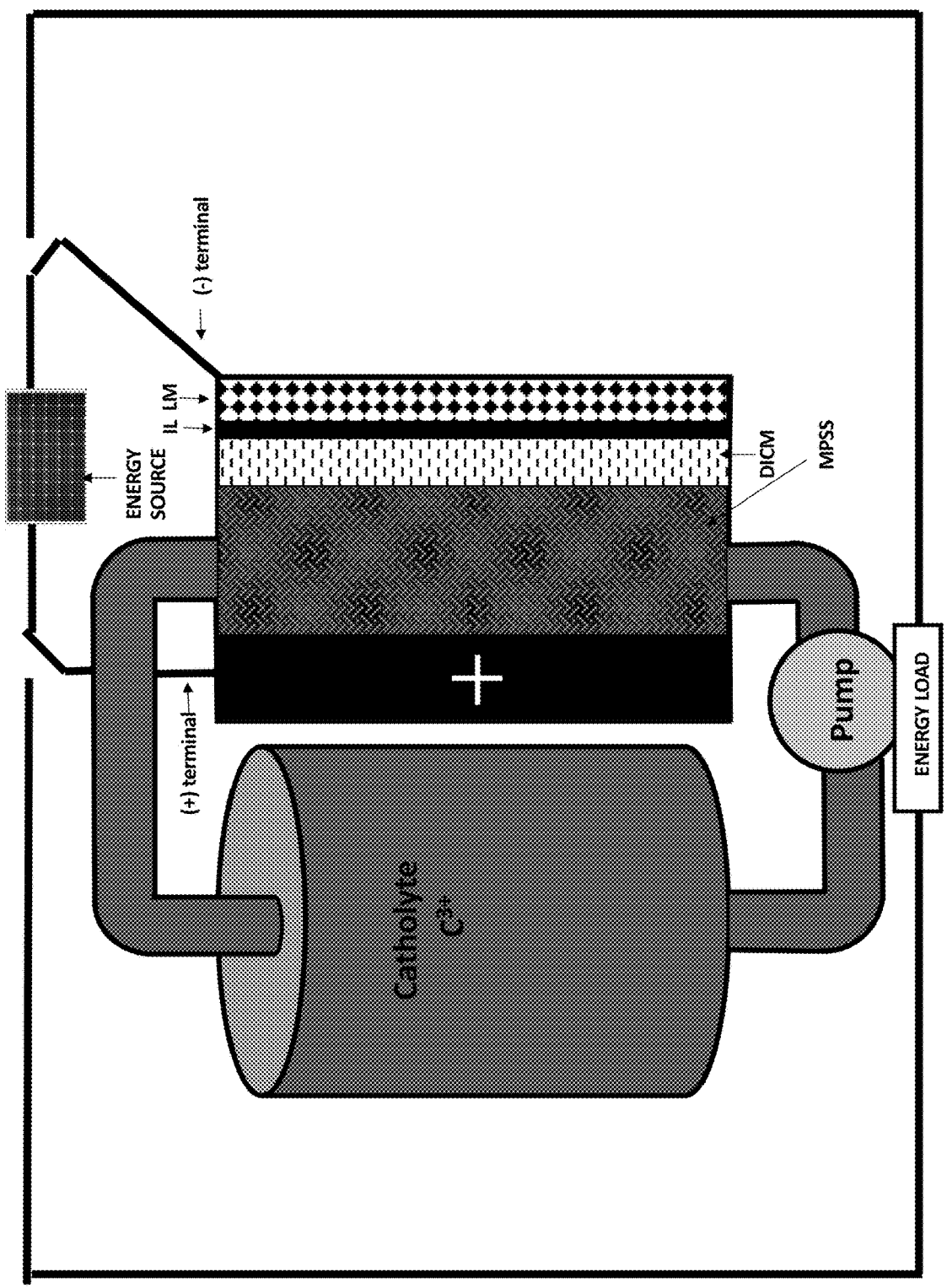
FIG. 2c is a representation of an exemplary redox flow battery including the example of FIG. 2b.

FIG. 2c: A representation of an exemplary redox flow battery including the example of FIG. 2b.

Figure 3A:
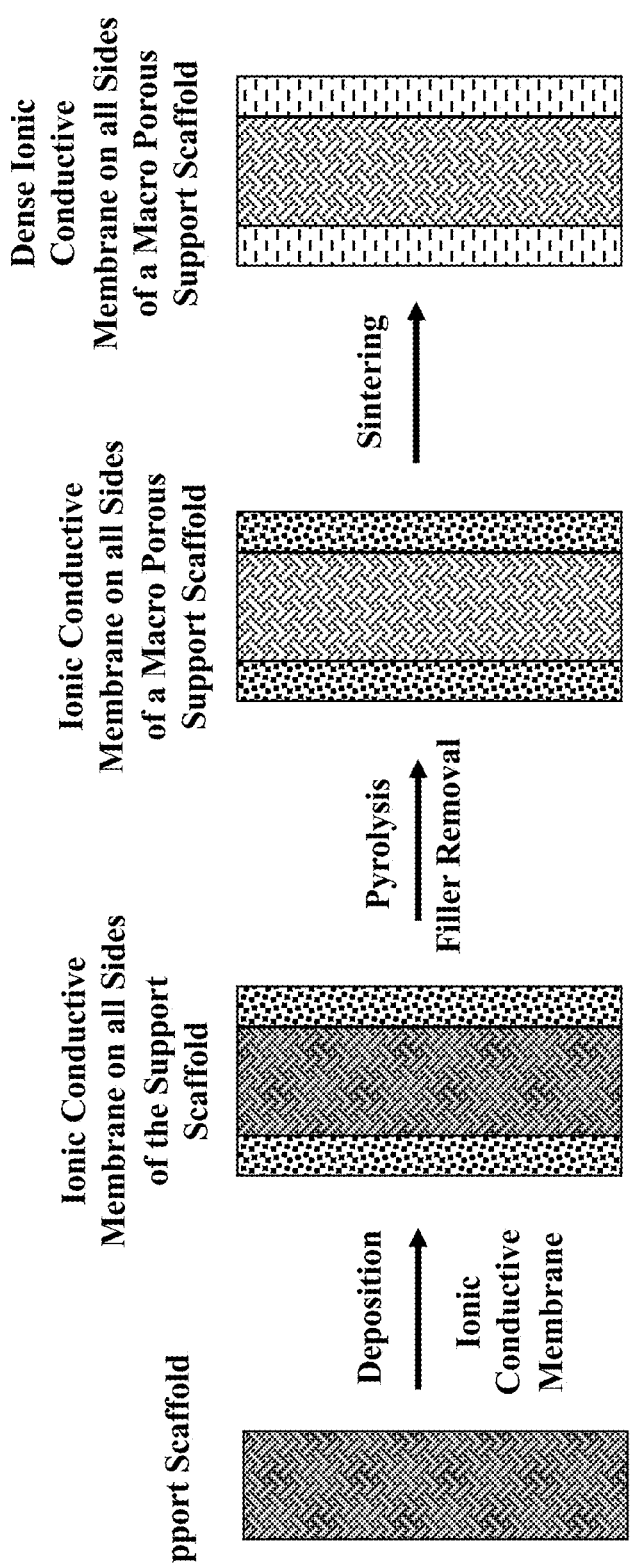
FIG. 3a is a schematic illustration of a macro porous support scaffold sandwiched between two ionic conductive membranes where the ionic conductive membranes are formed on opposite sides of the macro porous support scaffold.
Figure 3B:
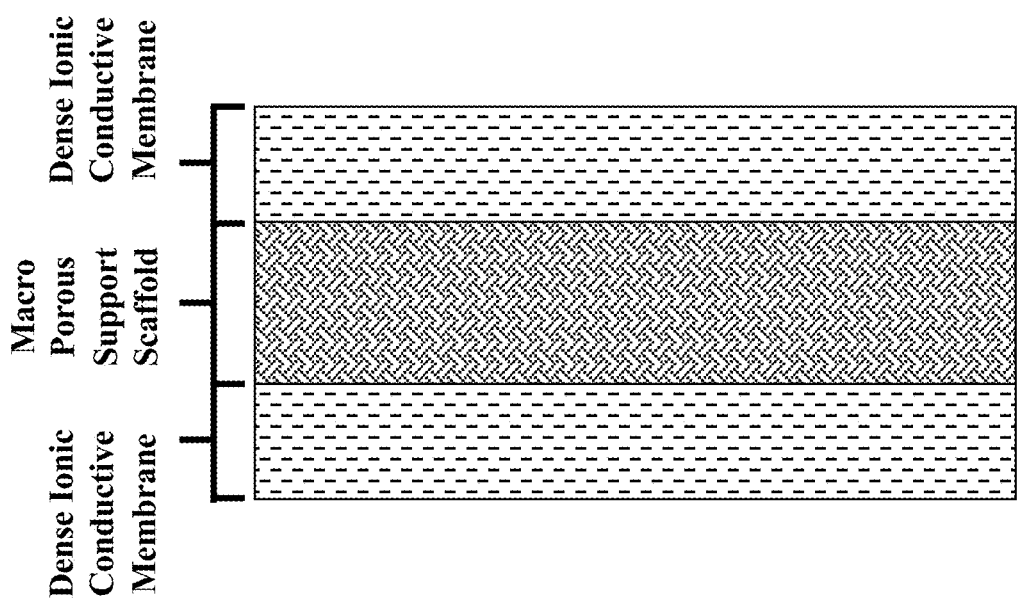
FIG. 3b is an artistic illustration of the final prototype outlined in FIG. 3a of two ionic conductive membranes formed on opposite sides of a macro porous support scaffold.
Figure 3C:
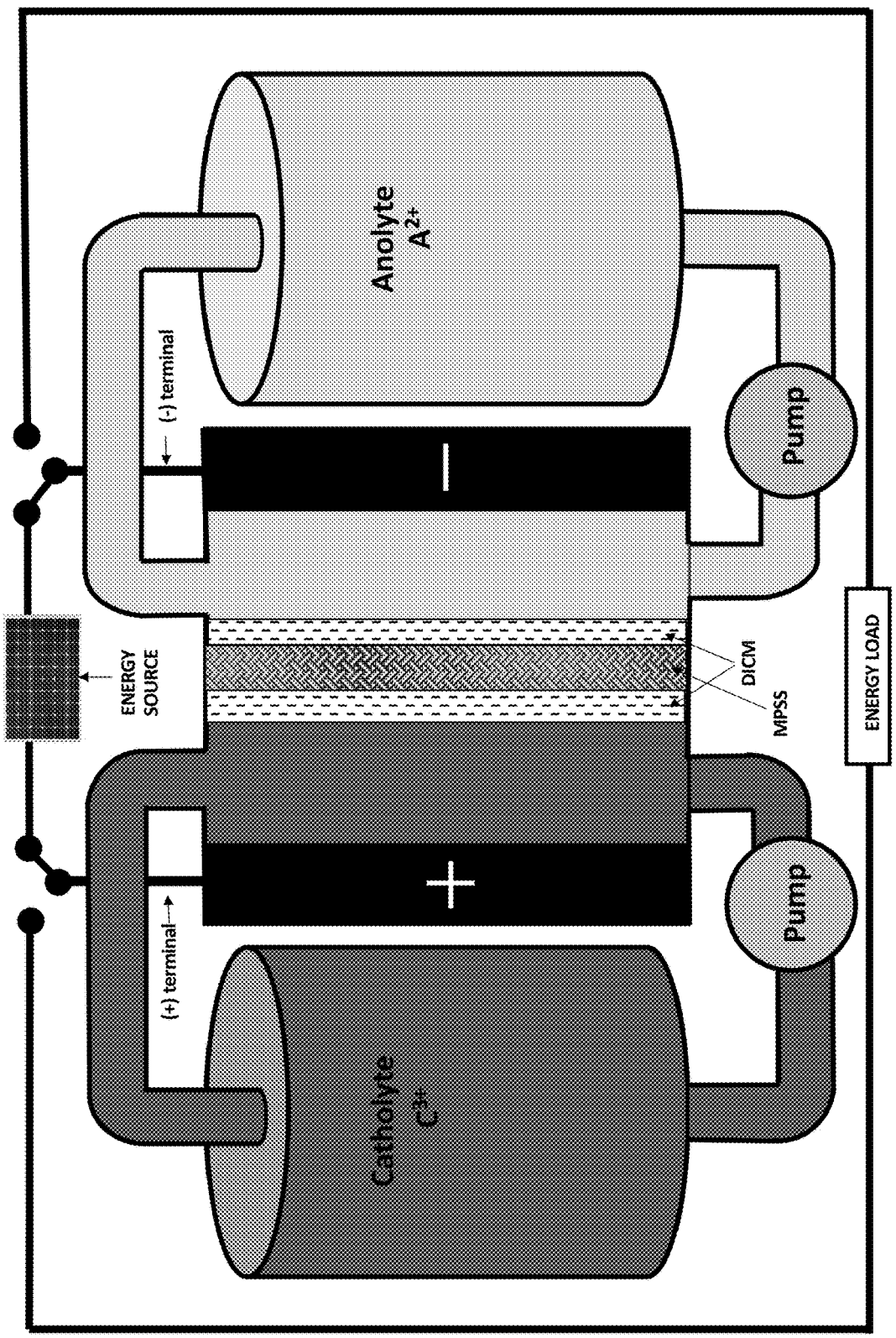
FIG. 3c is a representation of an exemplary redox flow battery including the example of FIG. 3b.

FIG. 3c: A representation of an exemplary redox flow battery including the example of FIG. 3b.

FIG. 3a: A schematic illustration of a macro porous support scaffold sandwiched between two ionic conductive membranes where the ionic conductive membranes are formed on opposite sides of the macro porous support scaffold.

FIG. 3b: An artistic illustration of the final prototype outlined in FIG. 3a of two ionic conductive membranes formed on opposite sides of a macro porous support scaffold.

Figure 4A:
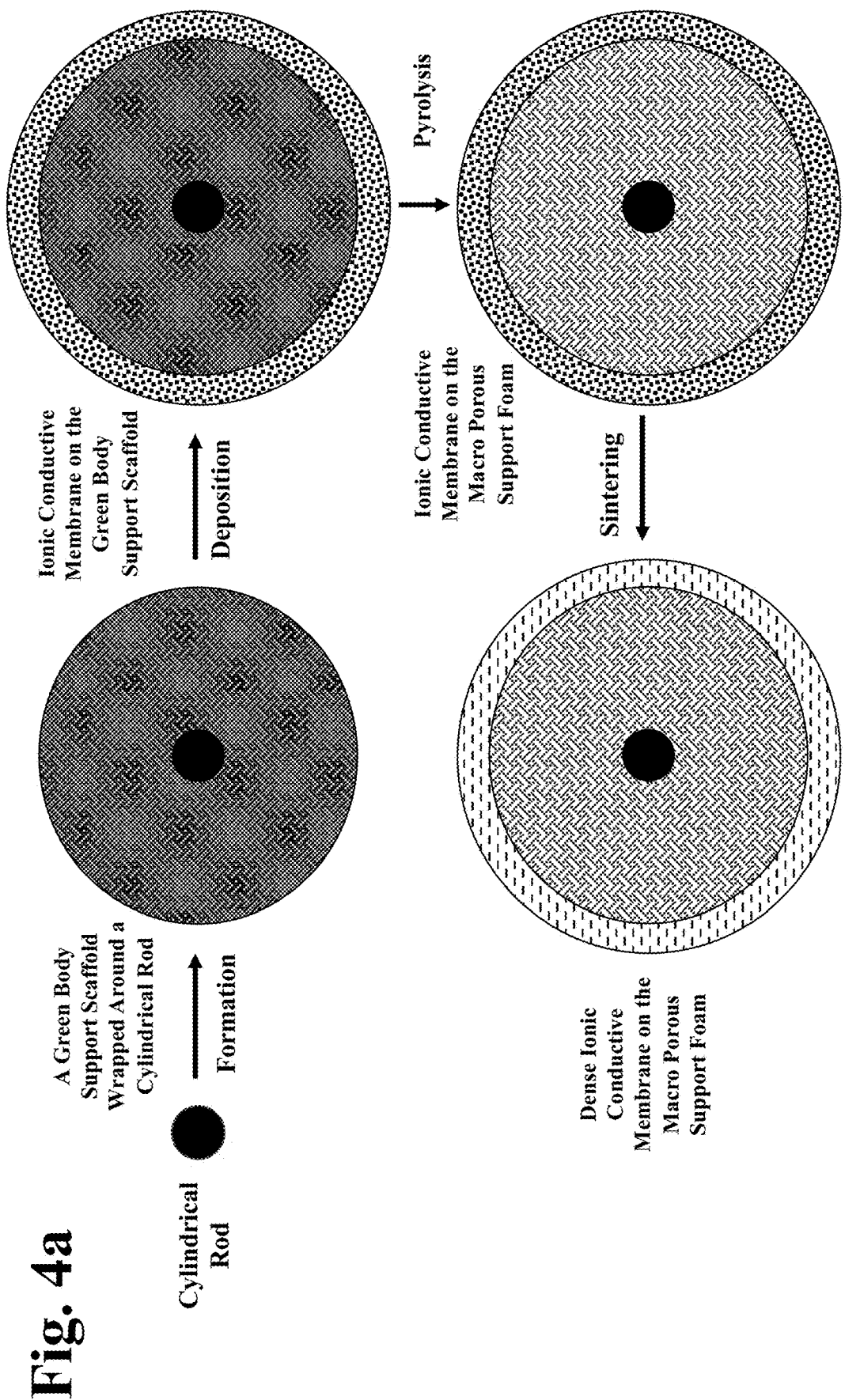
FIG. 4a is a schematic illustration from a cross-sectional view of a cylindrical shaped macro porous support scaffold formed around a cylindrical rod with an ionic conductive membrane formed on the outer surface of said macro porous support scaffold.

FIG. 4a: A schematic illustration from a cross-sectional view of a cylindrical shaped macro porous support scaffold formed around a cylindrical rod with an ionic conductive membrane formed on the outer surface of said macro porous support scaffold.

Figure 4B:
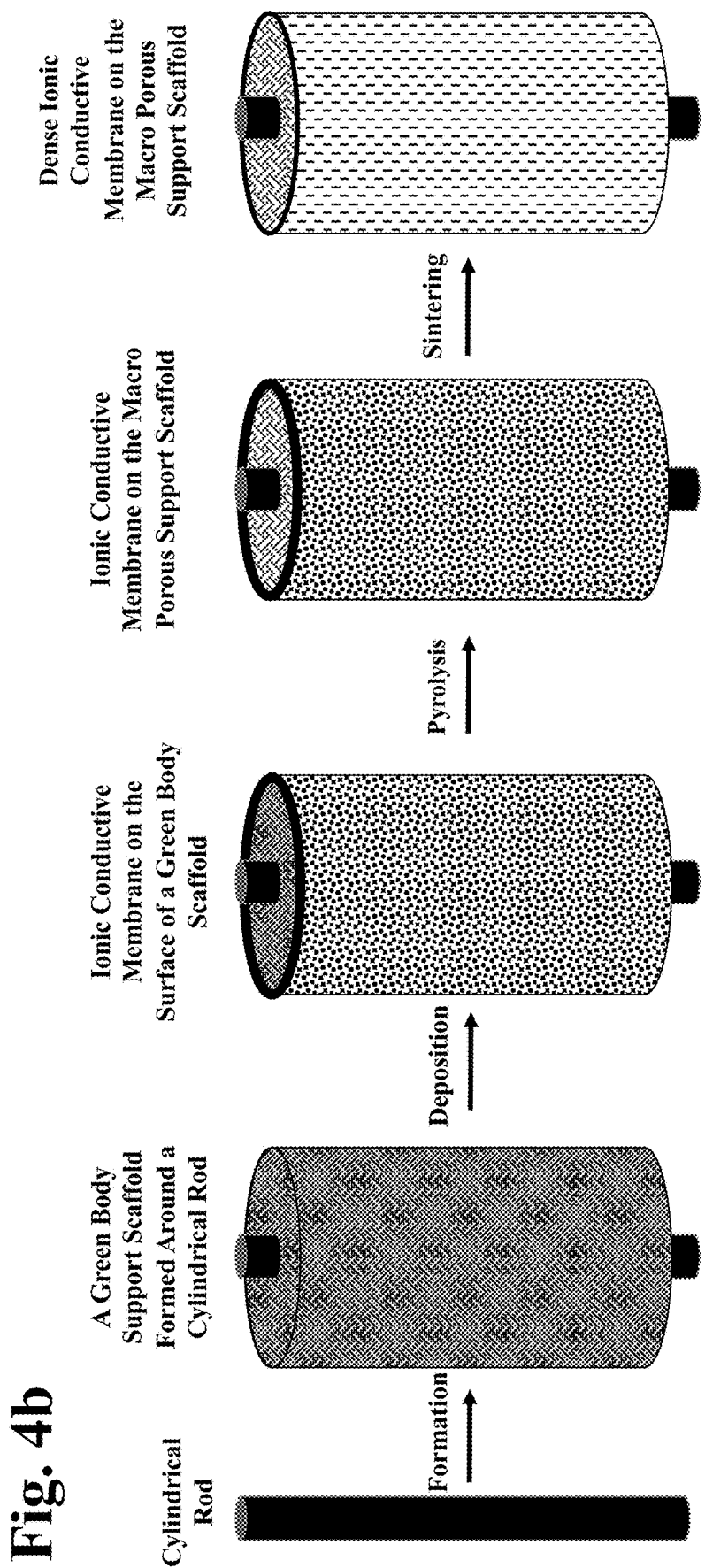
FIG. 4b is a three-dimensional schematic illustration of a cylindrical shaped macro porous support scaffold formed around a cylindrical rod with an ionic conductive membrane formed on the outer surface of said macro porous support scaffold.

FIG. 4b: A three-dimensional schematic illustration of a cylindrical shaped macro porous support scaffold formed around a cylindrical rod with an ionic conductive membrane formed on the outer surface of said macro porous support scaffold.

Figure 4C:
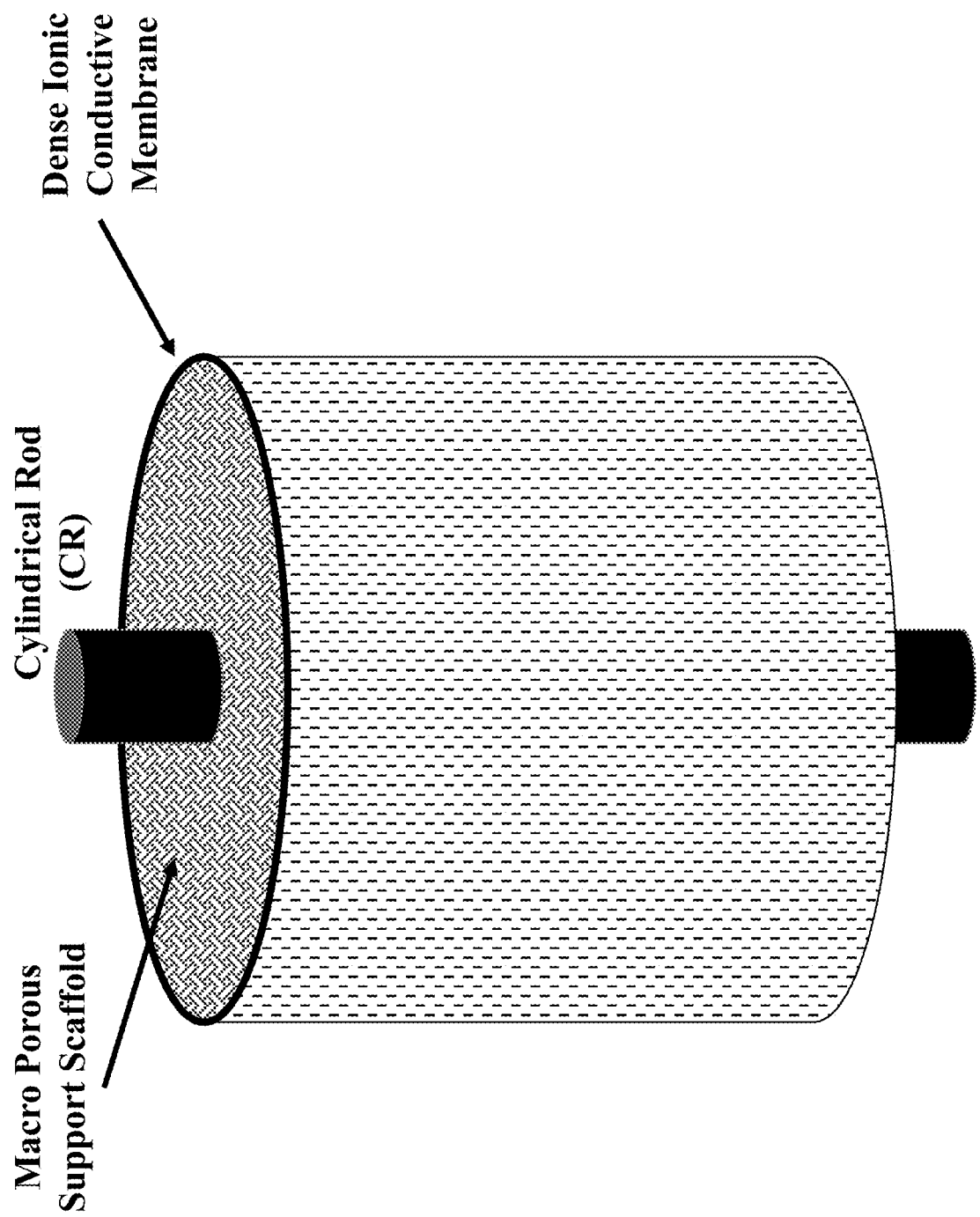
FIG. 4c is an artistic illustration of the final prototype outline in FIGS. 4a-b of a cylindrical shaped macro porous support scaffold formed around a cylindrical rod with an ionic conductive membrane formed on its outer surface.

FIG. 4c: An artistic illustration of the final prototype outline in FIGS. 4a-b of a cylindrical shaped macro porous support scaffold formed around a cylindrical rod with an ionic conductive membrane formed on its outer surface.

Figure 4D:
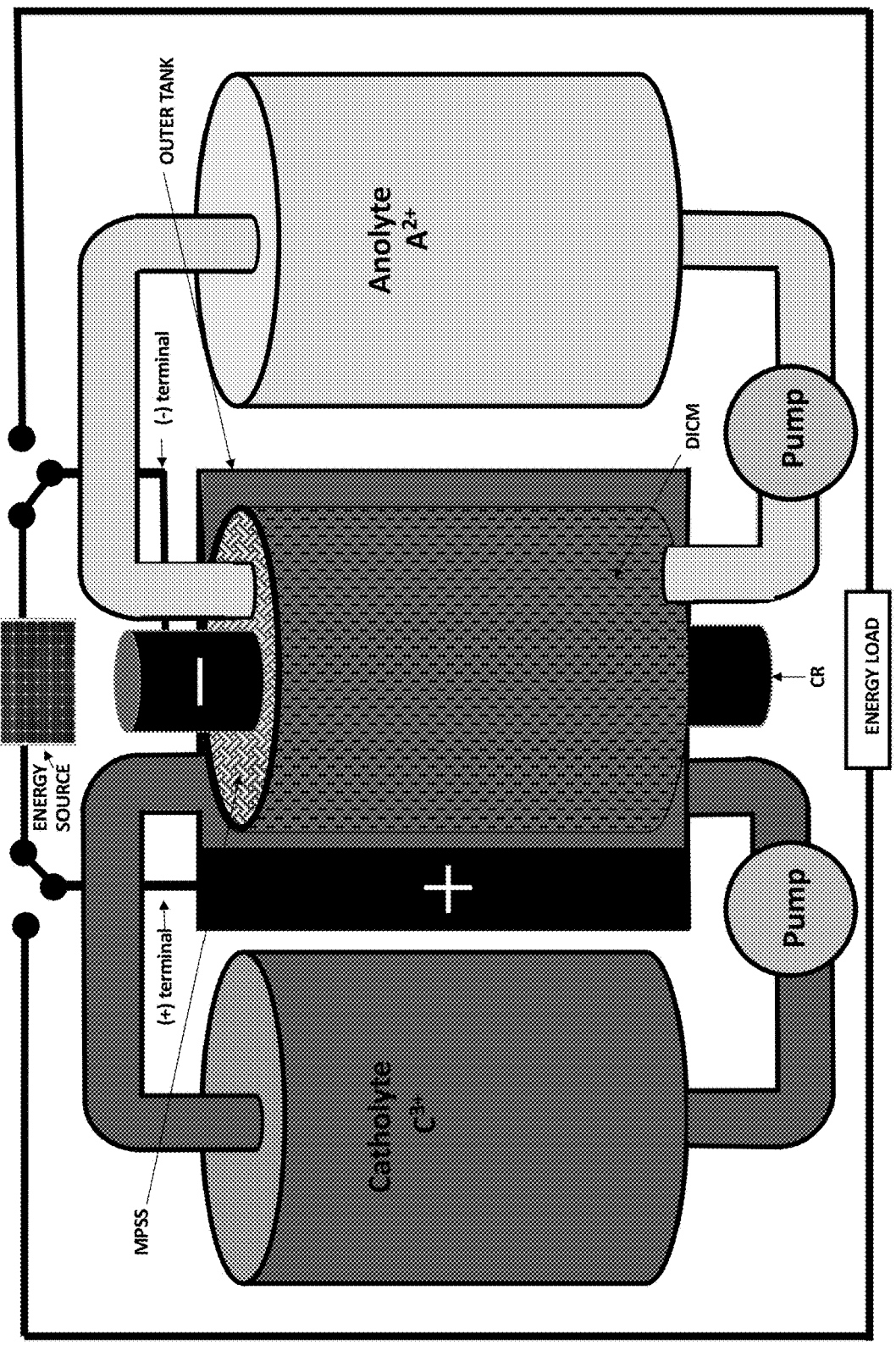
FIG. 4d is a representation of an exemplary redox flow battery including the example of FIG. 4c.

FIG. 4d: A representation of an exemplary redox flow battery including the example of FIG. 4c.

Figure 5A:
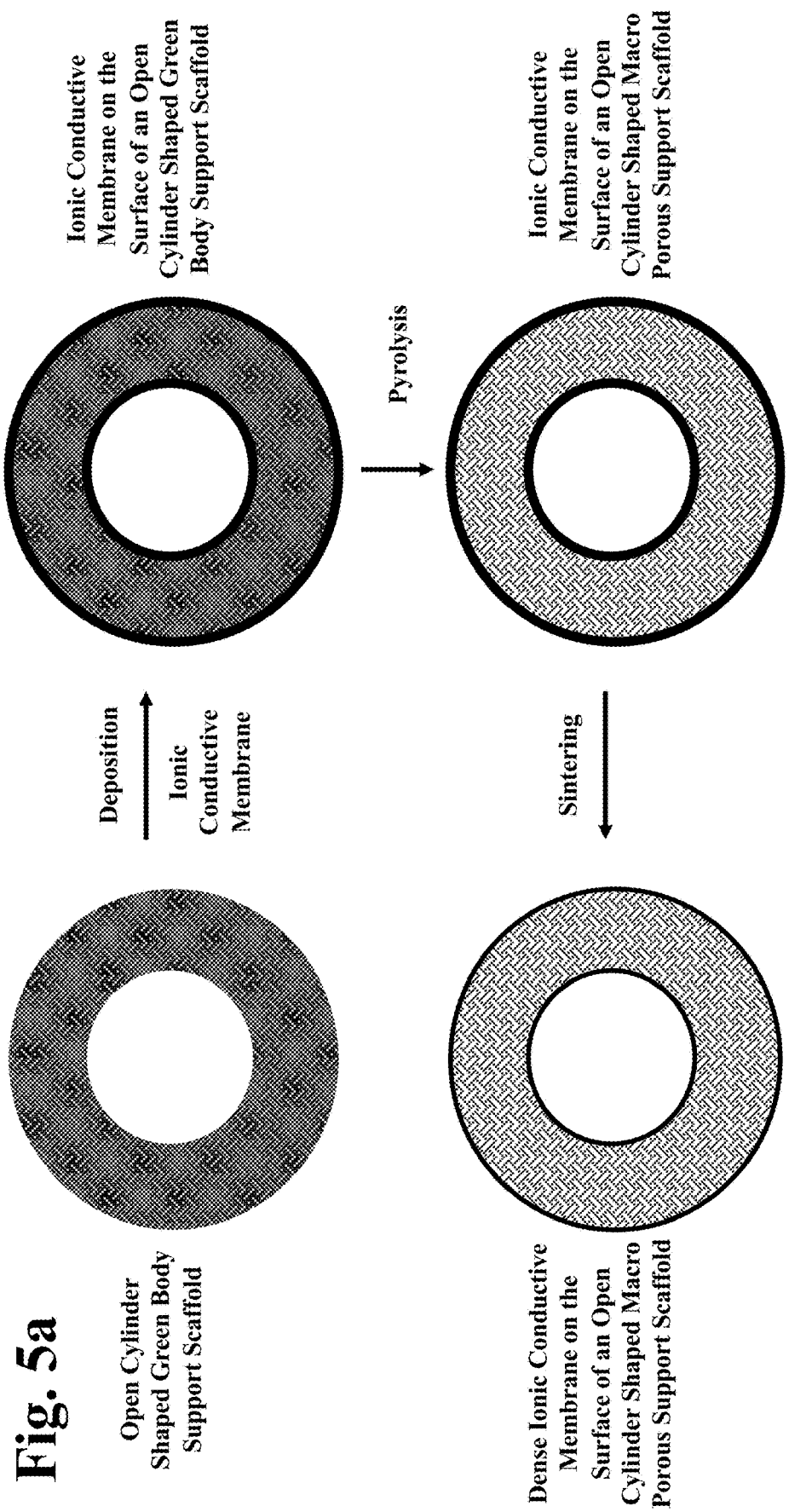
FIG. 5a is a schematic illustration from a cross-sectional view of an open cylindrical shaped macro porous support scaffold with an ionic conductive membrane formed on the inner and outer surface of said macro porous support scaffold.

FIG. 5a: A schematic illustration from a cross-sectional view of an open cylindrical shaped macro porous support scaffold with an ionic conductive membrane formed on the inner and outer surface of said macro porous support scaffold.

FIG. 5b: A three-dimensional schematic illustration of an open cylindrical shaped macro porous support scaffold with an ionic conductive membrane formed on the inner and outer surface of said macro porous support scaffold FIG. 5c: An artistic illustration of the final prototype outline in FIGS. 5a-b of an open cylindrical shaped macro porous support scaffold with an ionic conductive membrane formed on the inner and outer surface of said macro porous support scaffold.

Figure 5C:
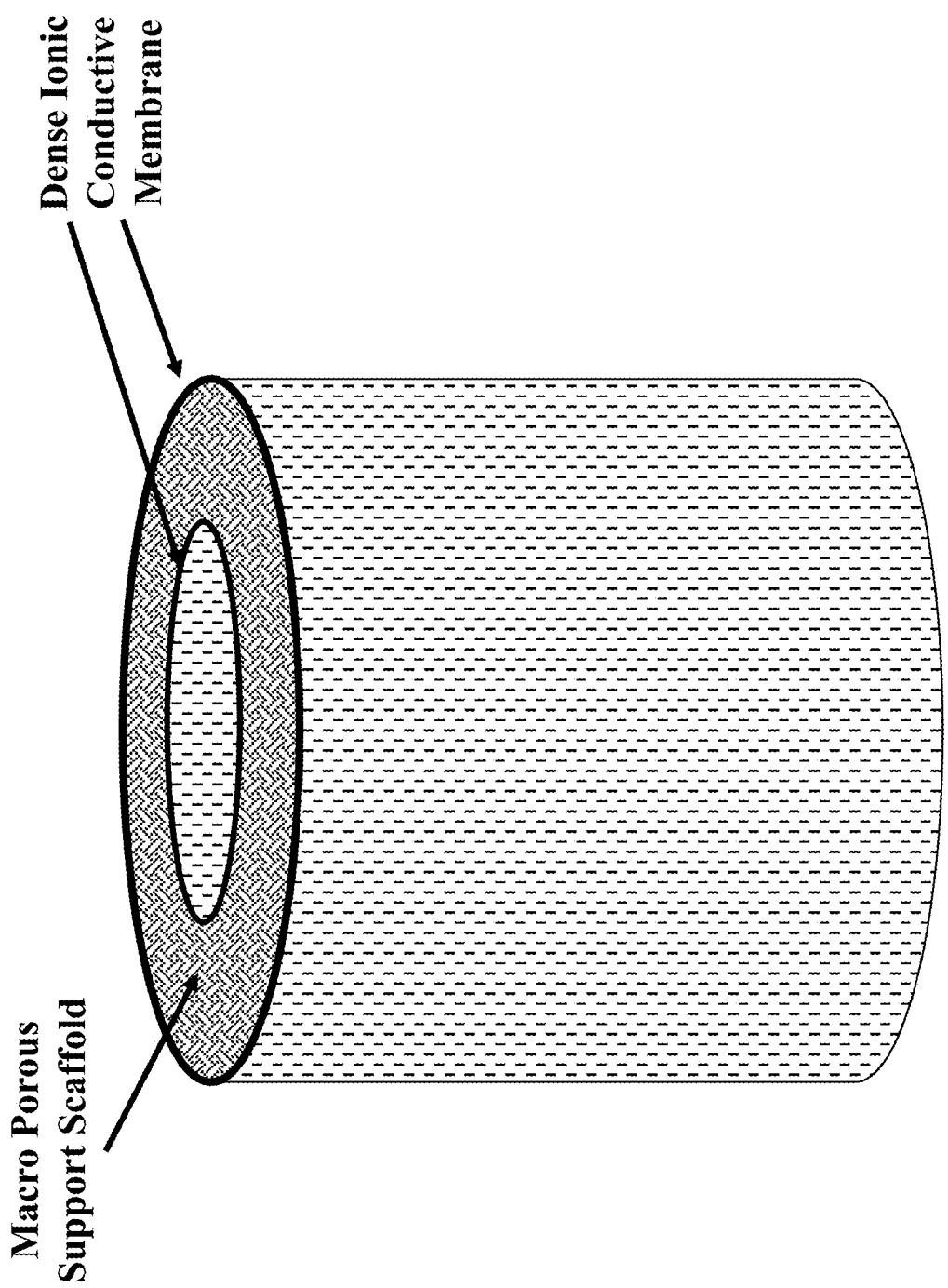
FIG. 5c is an artistic illustration of the final prototype outline in FIGS. 5a-b of an open cylindrical shaped macro porous support scaffold with an ionic conductive membrane formed on the inner and outer surface of said macro porous support scaffold.
Figure 5D:
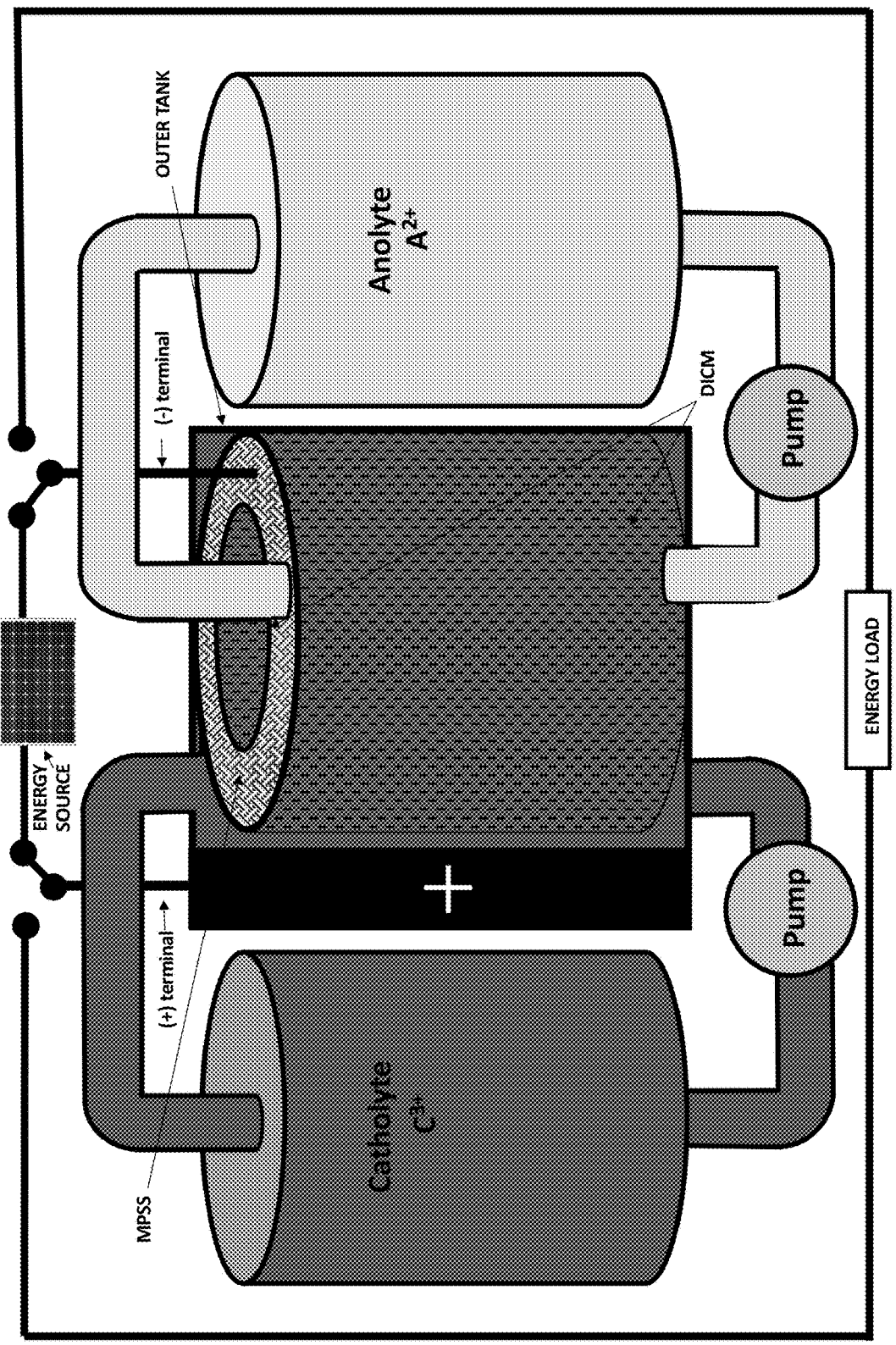
FIG. 5d is a representation of an exemplary redox flow battery including the example of FIG. 5c.

FIG. 5d: A representation of an exemplary redox flow battery including the example of FIG. 5c.

Figure 6A:
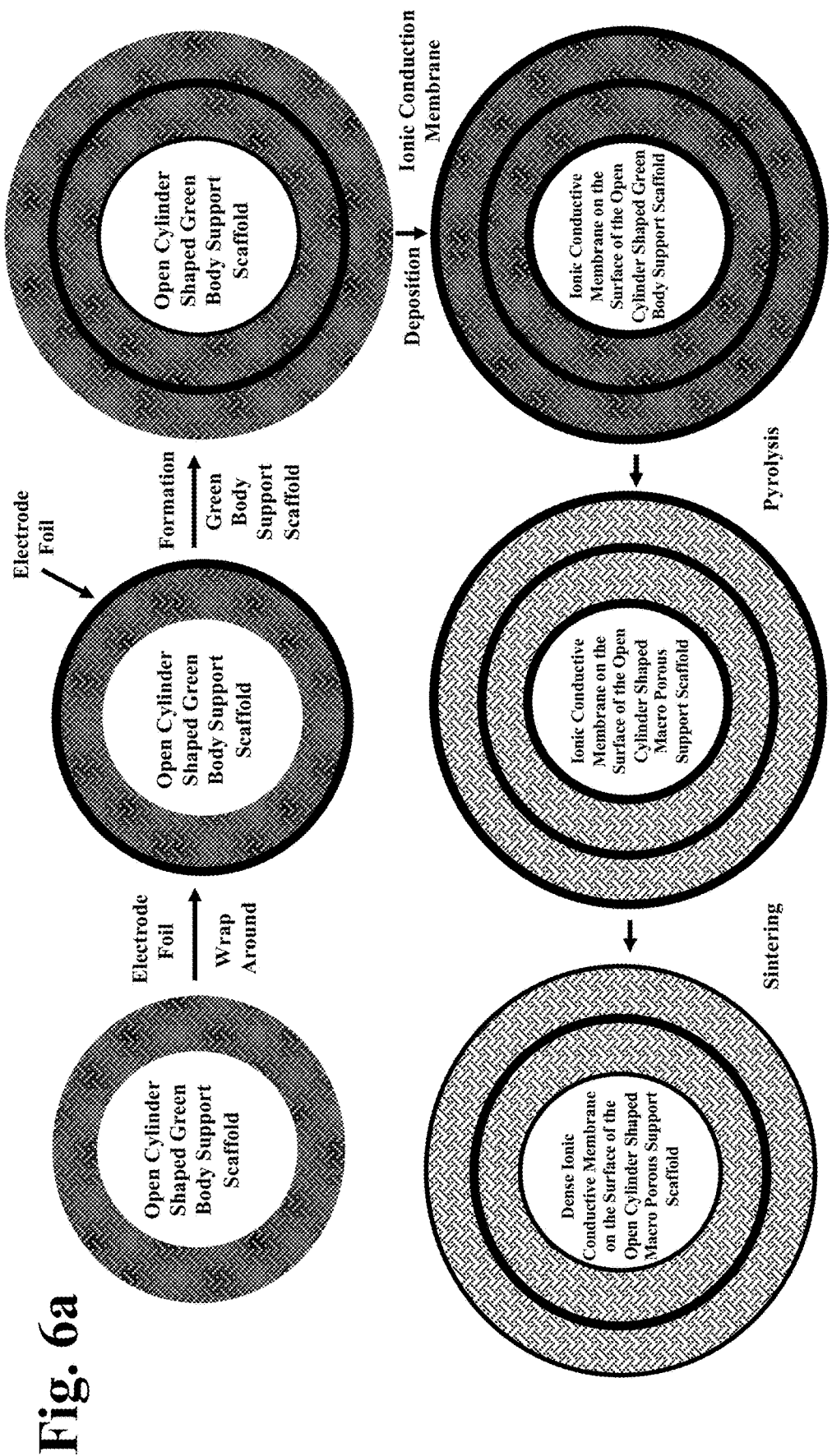
FIG. 6a is a schematic illustration from a cross-sectional view of two open cylindrical shaped macro porous support scaffolds with one inside the other where an electrode foil separates the two. An ionic conductive membrane is formed on the inner surface of the inner macro porous support scaffold and on the outer surface of the outer macro porous support scaffold.

FIG. 6a: A schematic illustration from a cross-sectional view of two open cylindrical shaped macro porous support scaffolds with one inside the other where an electrode foil separates the two. An ionic conductive membrane is formed on the inner surface of the inner macro porous support scaffold and on the outer surface of the outer macro porous support scaffold.

Figure 6B:
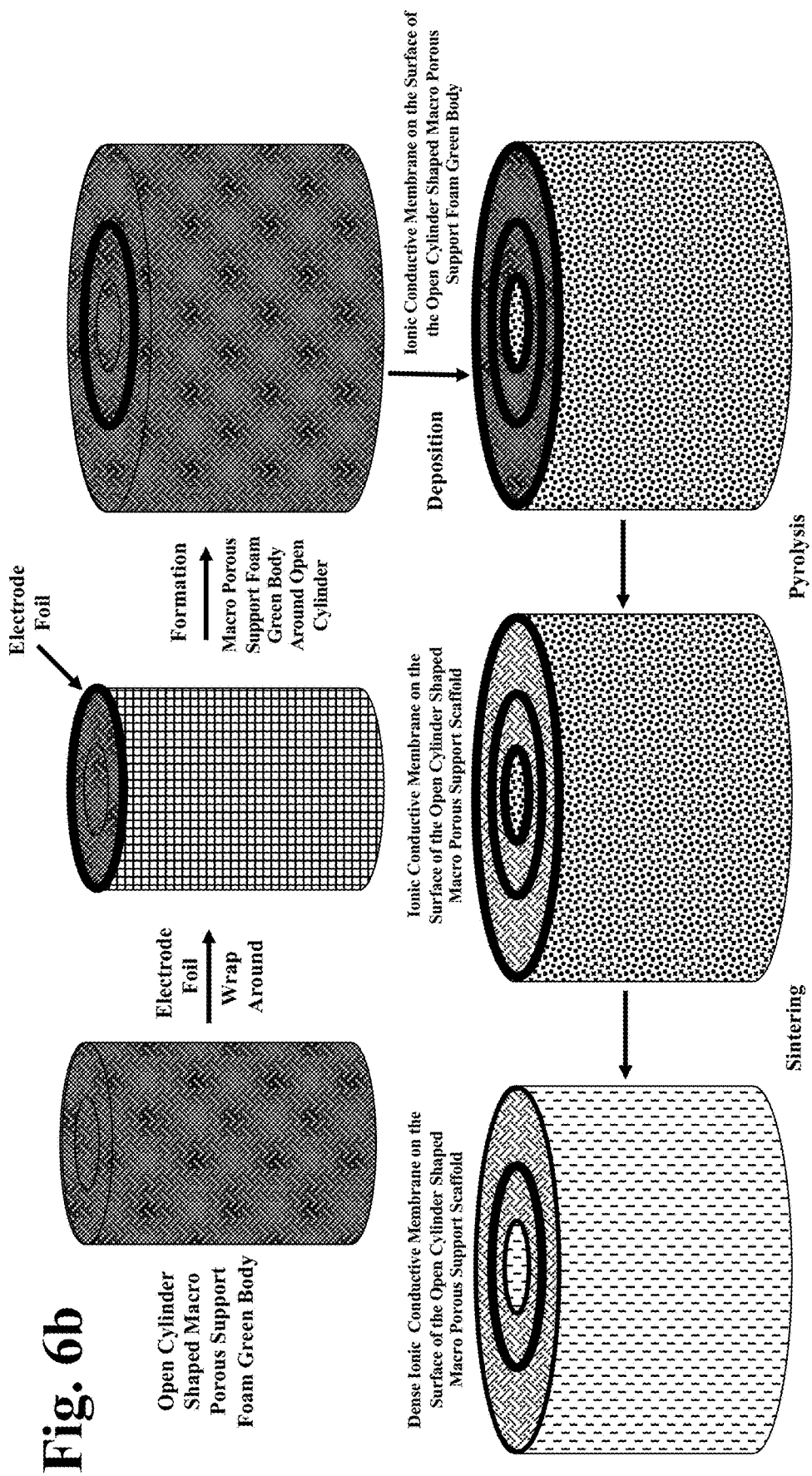
FIG. 6b is a three-dimensional schematic illustration of two open cylindrical shaped macro porous support scaffolds with one inside the other where an electrode foil separates the two. An ionic conductive membrane is formed on the inner surface of the inner macro porous support scaffold and on the outer surface of the outer macro porous support According to an example of the present description.

FIG. 6b: A three-dimensional schematic illustration of two open cylindrical shaped macro porous support scaffolds with one inside the other where an electrode foil separates the two. An ionic conductive membrane is formed on the inner surface of the inner macro porous support scaffold and on the outer surface of the outer macro porous support FIG. 6c: An artistic illustration of the final prototype outline in FIGS. 6a-b of two open cylindrical shaped macro porous support scaffolds with one inside the other where an electrode foil separates the two. An ionic conductive membrane is formed on the inner surface of the inner macro porous support scaffold and on the outer surface of the outer macro porous support scaffold.

Figure 6C:
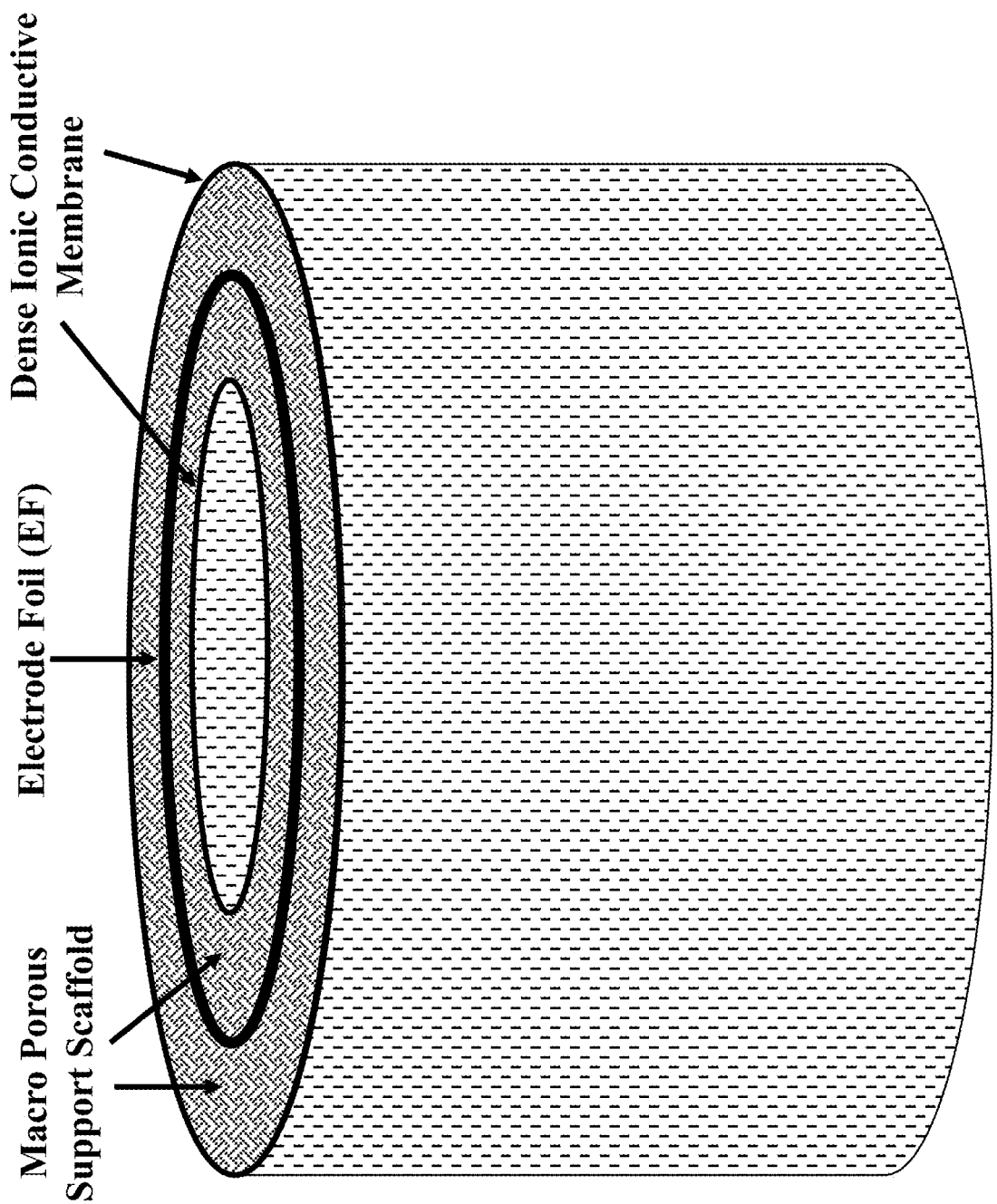
FIG. 6c is an artistic illustration of the final prototype outline in FIGS. 6a-b of two open cylindrical shaped macro porous support scaffolds with one inside the other where an electrode foil separates the two. An ionic conductive membrane is formed on the inner surface of the inner macro porous support scaffold and on the outer surface of the outer macro porous support scaffold.
Figure 6D:
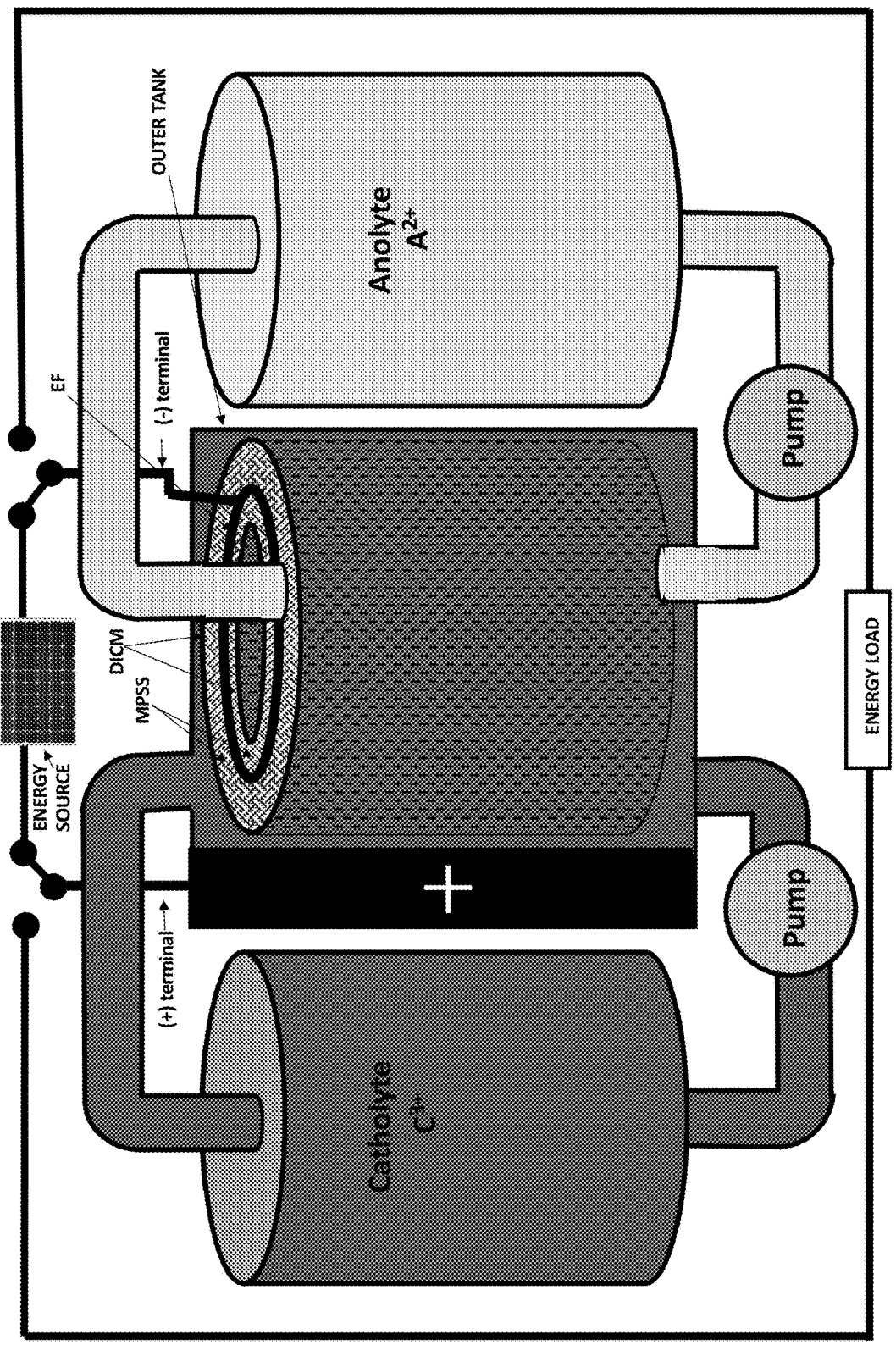
FIG. 6d is a representation of an exemplary redox flow battery including the example of FIG. 6c.

FIG. 6d: A representation of an exemplary redox flow battery including the example of FIG. 6c.

FIG. 7a: A schematic illustration from a cross-sectional view of a cylindrical shaped electrode foil surrounded by an open shaped cylindrical macro porous with an ionic conductive membrane on its other surface. A second open shaped cylindrical macro porous support scaffold is formed around the ionic conductive membrane with a second electrode foil wrapped around the outer surface of the outer macro porous support scaffold.

Figure 7B:
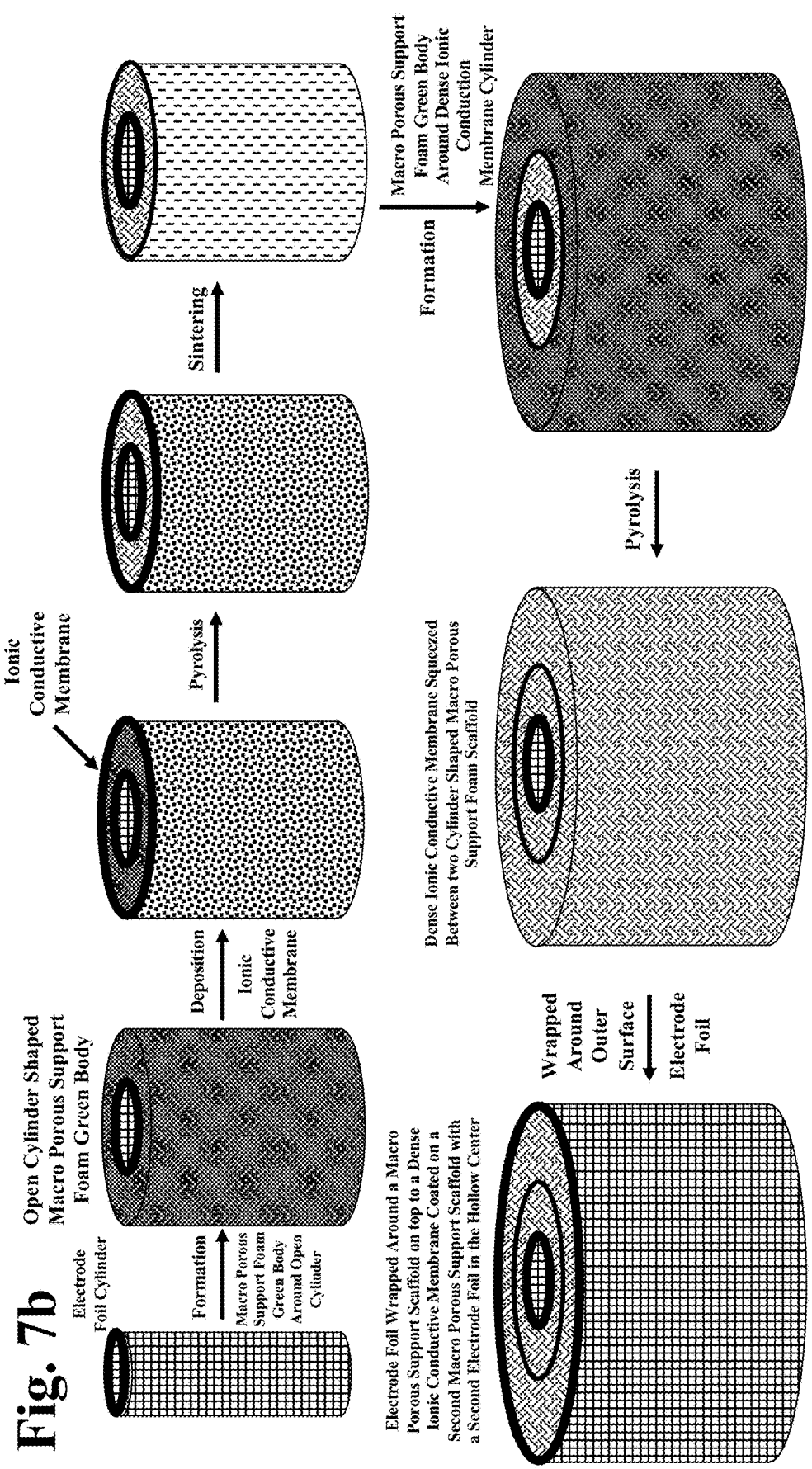
FIG. 7b is a three-dimensional schematic illustration of a cylindrical shaped electrode foil surrounded by an open shaped cylindrical macro porous with an ionic conductive membrane on its other surface. A second open shaped cylindrical macro porous support scaffold is formed around the ionic conductive membrane with a second electrode foil wrapped around the outer surface of the outer macro porous support scaffold.

FIG. 7b: A three-dimensional schematic illustration of a cylindrical shaped electrode foil surrounded by an open shaped cylindrical macro porous with an ionic conductive membrane on its other surface. A second open shaped cylindrical macro porous support scaffold is formed around the ionic conductive membrane with a second electrode foil wrapped around the outer surface of the outer macro porous support scaffold.

FIG. 7c: An artistic illustration of the final prototype outline in FIGS. 7a-b of a cylindrical shaped electrode foil surrounded by an open shaped cylindrical macro porous with an ionic conductive membrane on its other surface. A second open shaped cylindrical macro porous support scaffold is formed around the ionic conductive membrane with a second electrode foil wrapped around the outer surface of the outer macro porous support scaffold.

Figure 7D:
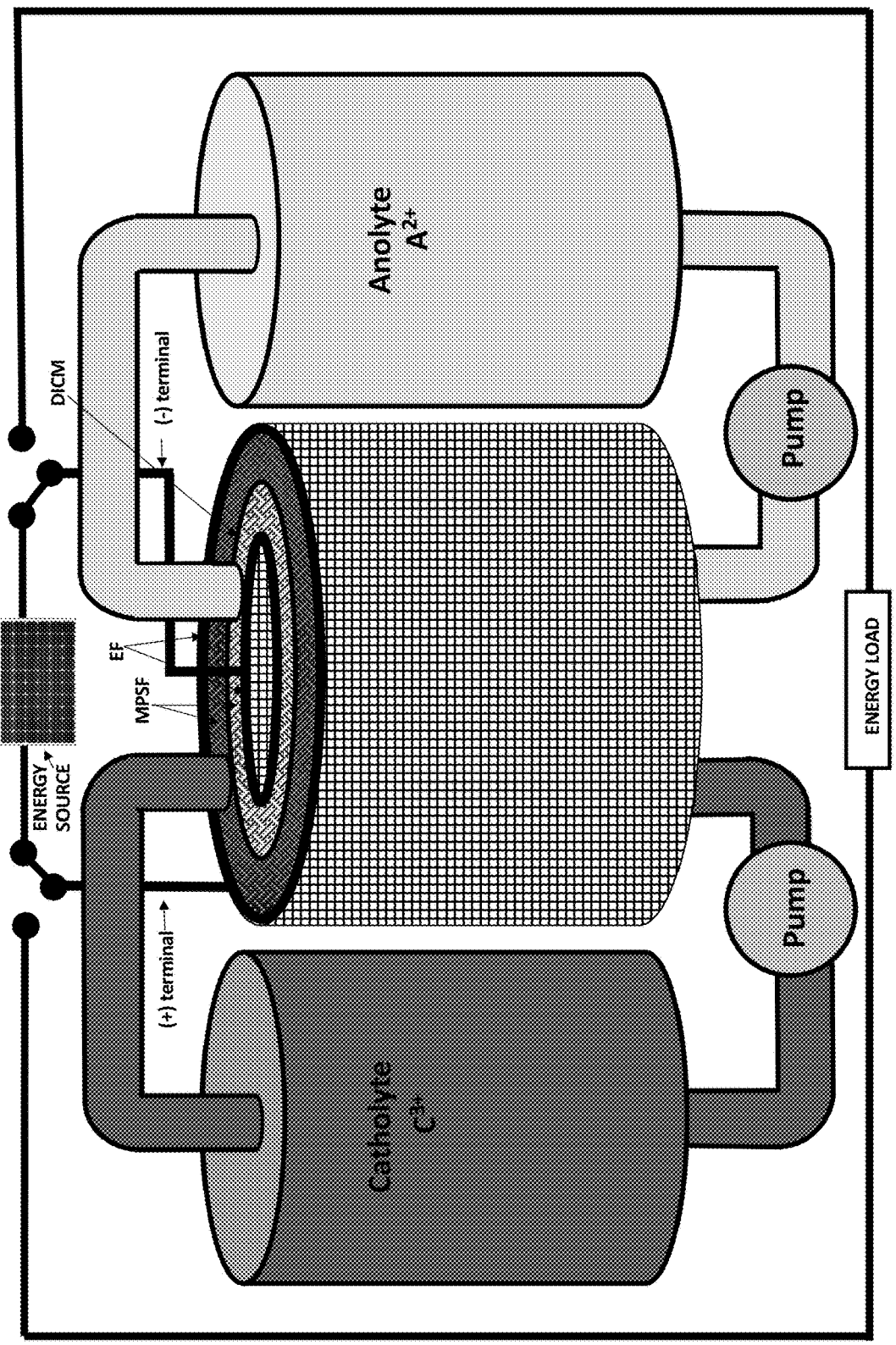
FIG. 7d is a representation of an exemplary redox flow battery including the example of FIG. 7c.

FIG. 7d: A representation of an exemplary redox flow battery including the example of FIG. 7c.

Figure 8A:
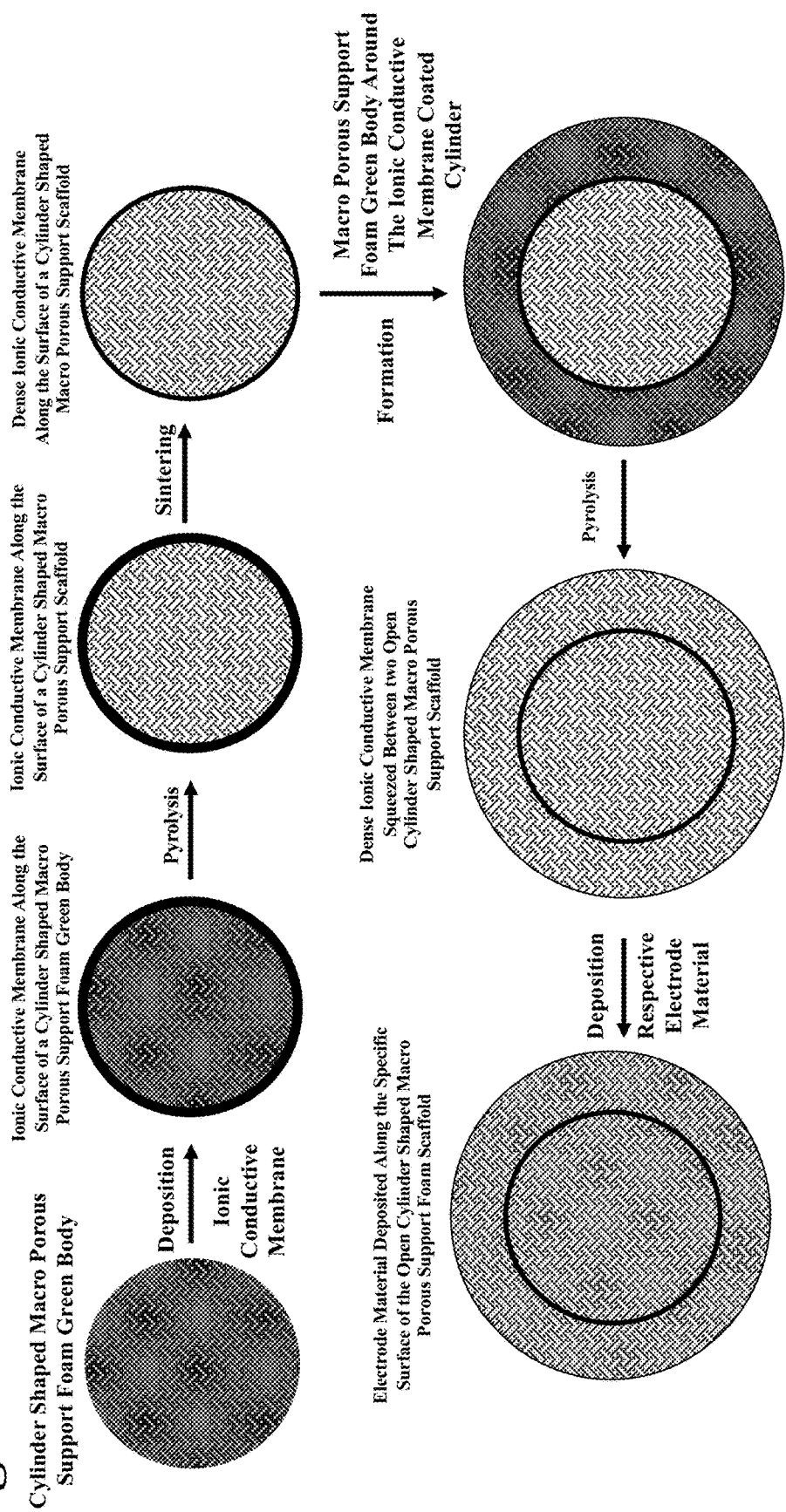
FIG. 8a is a schematic illustration from a cross-sectional view of a closed cylindrical shaped macro porous support scaffold with an ionic conductive membrane on its outer surface with a second open cylindrical shaped macro porous support scaffold surrounding the outer surface of the ionic conductive membrane.

FIG. 8a: A schematic illustration from a cross-sectional view of a closed cylindrical shaped macro porous support scaffold with an ionic conductive membrane on its outer surface with a second open cylindrical shaped macro porous support scaffold surrounding the outer surface of the ionic conductive membrane.

Figure 8B:
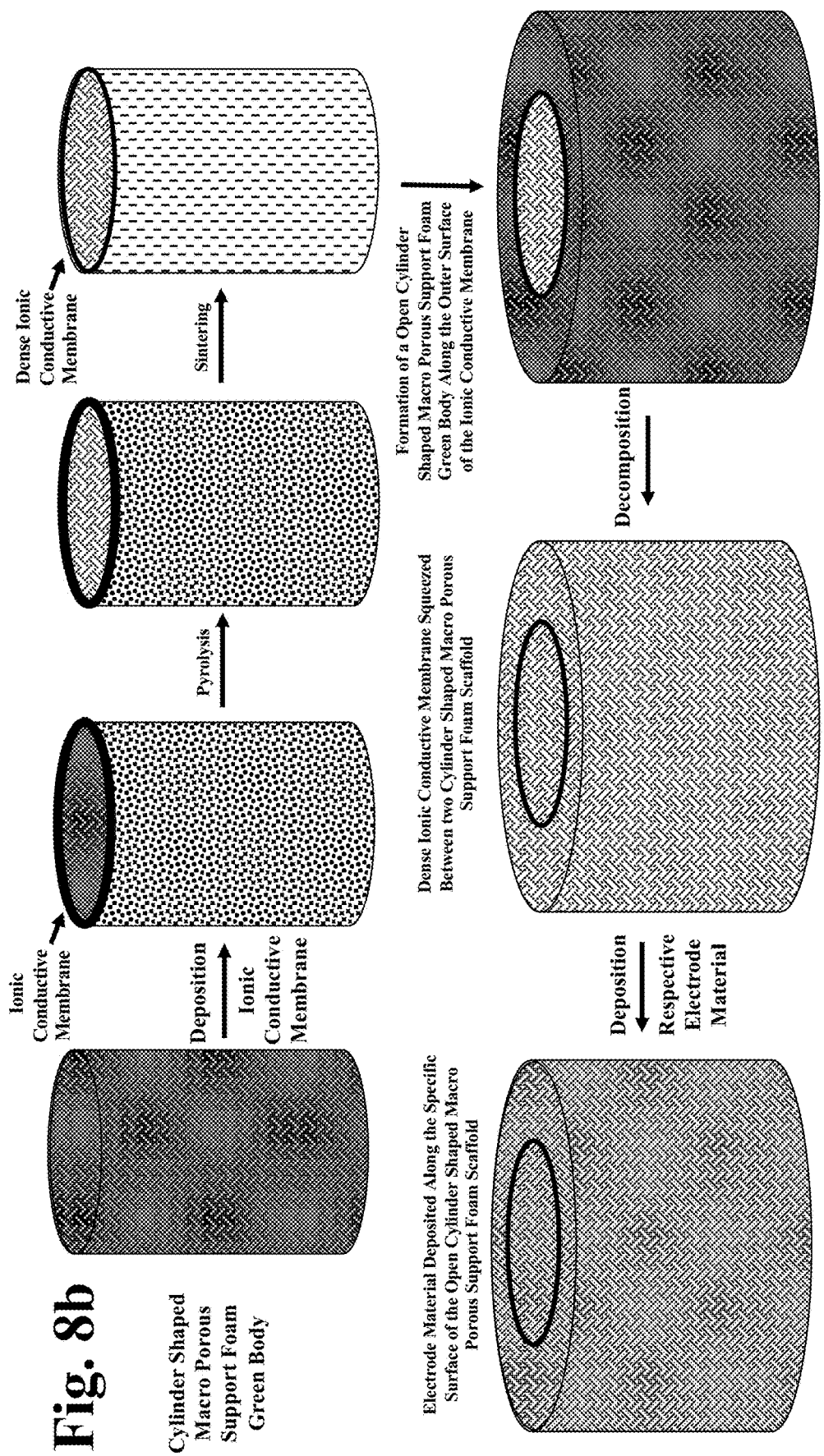
FIG. 8b is a three-dimensional schematic illustration of a closed cylindrical shaped macro porous support scaffold with an ionic conductive membrane on its outer surface with a second open cylindrical shaped macro porous support scaffold surrounding the outer surface of the ionic conductive membrane.

FIG. 8b: A three-dimensional schematic illustration of a closed cylindrical shaped macro porous support scaffold with an ionic conductive membrane on its outer surface with a second open cylindrical shaped macro porous support scaffold surrounding the outer surface of the ionic conductive membrane.

Figure 8C:
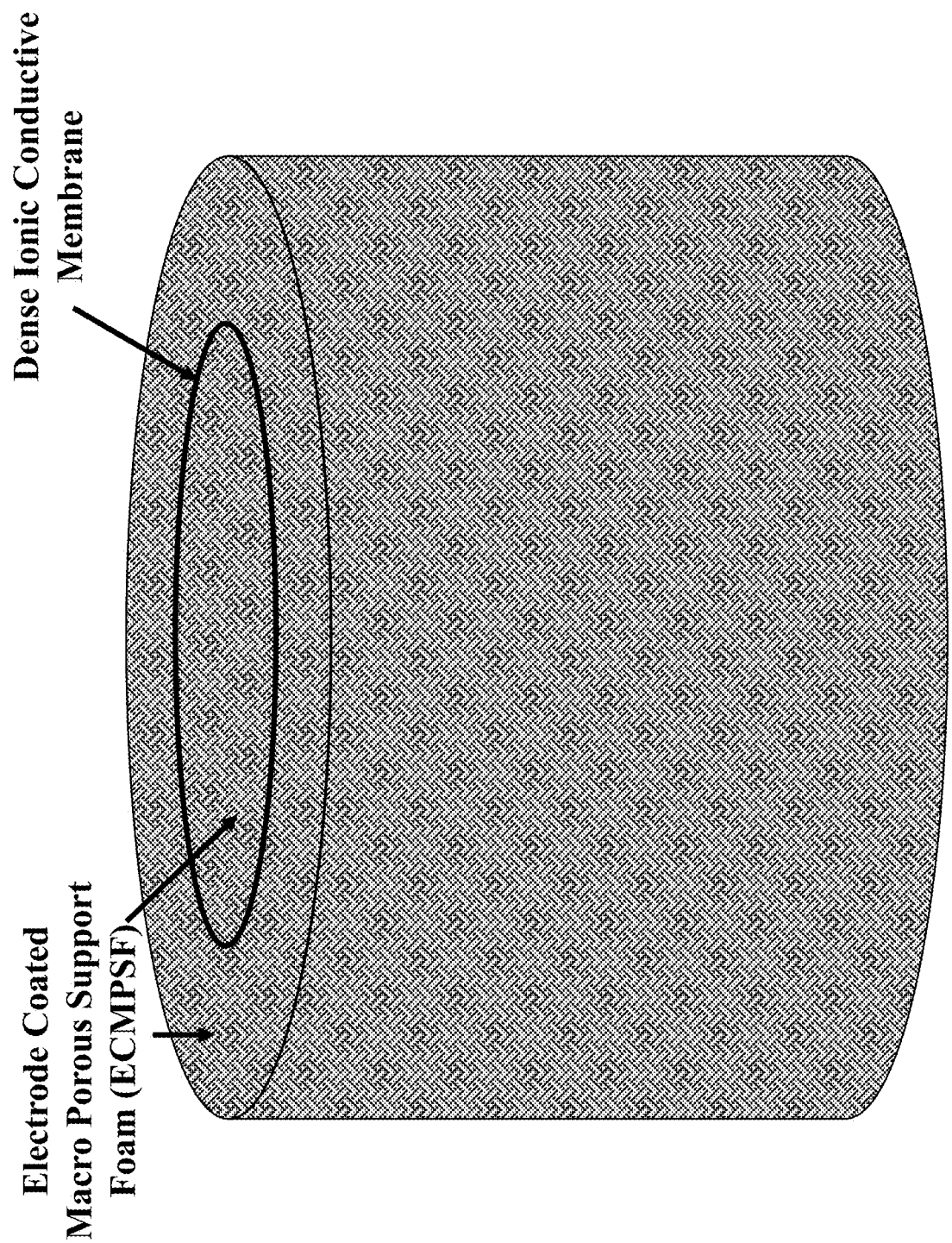
FIG. 8c is a schematic illustration of the final prototype outline in FIGS. 8a-b of a closed cylindrical shaped macro porous support scaffold with an ionic conductive membrane on its outer surface with a second open cylindrical shaped macro porous support scaffold surrounding the outer surface of the ionic conductive membrane.

FIG. 8c: A schematic illustration of the final prototype outline in FIGS. 8a-b of a closed cylindrical shaped macro porous support scaffold with an ionic conductive membrane on its outer surface with a second open cylindrical shaped macro porous support scaffold surrounding the outer surface of the ionic conductive membrane.

Figure 8D:
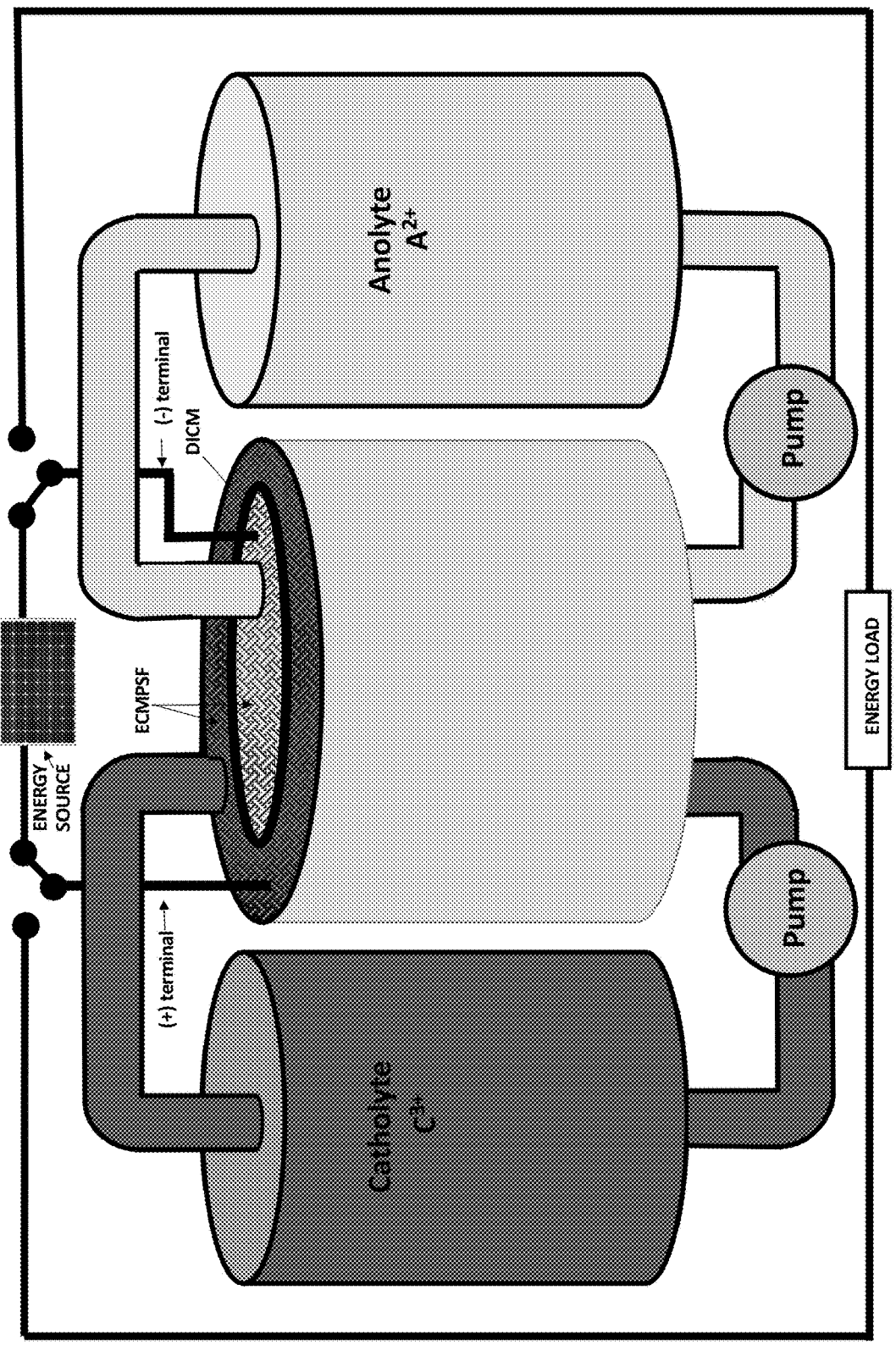
FIG. 8d is a representation of an exemplary redox flow battery including the example of FIG. 8c.

FIG. 8d: A representation of an exemplary redox flow battery including the example of FIG. 8c.

The following examples relates to the field of systems and methods for constructing an ionic conductive membrane on macro porous support scaffolds for the purposes of a redox flow battery membrane, particularly lithium based redox flow battery membrane.

Other optional aspects of the structural design of the membrane will be apparent from the remainder of the present description. Exemplary structural designs for membrane include, but are not limited to the following forms:

An ionic conductive membrane may be deposited on top of a flat surface of a support scaffold. A second support scaffold may then be formed on top of the ionic conductive membrane. The support scaffolds can be green body support scaffolds that are converted to a macro porous support scaffold through pyrolysis. Alternatively, the support scaffolds may be a pre-filled support scaffolds where the pre-filling material is then removed. Once the macro porous support scaffolds are formed, the ionic conductive membrane may be sintered. An illustration of the membrane structure can be seen in FIGS. 1a and b.

FIG. 1c is a representation of an exemplary redox flow battery including the example of FIG. 1b. As shown, a catholyte and an anolyte flows through the first support scaffold and second support scaffold, and an ionic constitute of the catholyte or anolyte passes through the dense ionic conductive membrane. The positive and negative terminals are connected to positive and negative electrode, through which energy is extracted to power an energy load or energy is stored from an energy source, such as a solar panel.

An ionic conductive membrane may be deposited on top of a flat surface of a support scaffold. The support scaffolds can be green body support scaffolds that are converted to a macro porous support scaffold through decomposition. Alternatively, the support scaffolds can be a pre-filled support scaffolds where the pre-filling material is then removed. Once the macro porous support scaffolds are formed, the ionic conductive membrane may be sintered. A thin interface layer may be formed on top of the ionic conductive membrane. A thin layer of lithium may then be formed on top of the interface layer. An illustration of the membrane structure formation can be seen in FIGS. 2a and b.

FIG. 2c is a representation of an exemplary semi-solid redox flow battery including the example of FIG. 2b. As shown, a catholyte flows through the support scaffold, and an ionic constitute of the catholyte passes through the dense ionic conductive membrane. The positive and negative terminals are connected to positive electrode and the lithium metal, through which energy is extracted to power an energy load or energy is stored from an energy source, such as a solar panel. Although FIG. 2c shows a catholyte, it will be understood that the catholyte could be replaced by an anolyte.

In an aspect, the interface layer may be directly deposited on top of the ionic conductive membrane. Thermal treatment may be required to densify the interface layer. Alternatively, a material may be deposited on top of the ionic conductive membrane followed by a conversion to the actual interface layer. Conversion techniques may include, but not limited to thermal, chemical, etc. The interface layer acts as a protection layer if the electrolyte material is unstable to lithium metal when in direct contact, materials includes but not limited to LiPON. In another occasion, the layer could act as a wetting layer between lithium metal and the solid-state electrolyte materials, such as $Al_2O_3$ layer between lithium and LLZO.

In an aspect, lithium metal may be directly deposited on top of the interface layer. Alternatively, a lithium containing material may be deposited on top of the interface layer followed by a conversion to lithium metal. Conversion techniques may include, but not limited to thermal, chemical, etc.

An ionic conductive membrane may be deposited on both sides of a support scaffold. The support scaffolds can be green body support scaffolds that are converted to a macro porous support scaffold through decomposition. Alternatively, the support scaffolds can be a pre-filled support scaffolds where the pre-filling material is then removed. Once the macro porous support scaffolds are formed, the ionic conductive membrane may be sintered. An illustration of the membrane structure formation can be seen in FIGS. 3a and b.

FIG. 3c is a representation of an exemplary redox flow battery including the example of FIG. 3b. As shown, a catholyte and an anolyte adjacent to the first dense ionic conductive membrane and second dense ionic conductive membrane, and an ionic constitute of the catholyte or anolyte passes through the dense ionic conductive membrane. The positive and negative terminals are connected to positive and negative electrode, through which energy is extracted to power an energy load or energy is stored from an energy source, such as a solar panel.

A green body support scaffold may be formed around a rod or cylinder-shaped structure using a pre-made mold. The rod or cylinder-shaped structure can be hollow or solid and can be composed of, but not limited to, metal, plastic, polymer, Teflon, wood, etc. Though it is preferred that the shape of the green body is a cylinder, there is no specified requirements. An ionic conductive membrane is then formed on the surface of the green body support scaffold. The green body support scaffold is then converted to a macro porous support scaffold through pyrolysis. The ionic conductive membrane may be sintered. An illustration of the membrane structure formation can be seen in FIGS. 4a-c.

FIG. 4d is a representation of an exemplary redox flow battery including the example of FIG. 4c. As shown, a catholyte flows through an outer tank and an anolyte flows through the macro porous support scaffold, and an ionic constitute of the catholyte or anolyte passes through the dense ionic conductive membrane. The positive and negative terminals are connected to positive and negative electrode, through which energy is extracted to power an energy load or energy is stored from an energy source, such as a solar panel. Although FIG. 4d shows a catholyte flowing through an outer tank and an anolyte flows through the macro porous support scaffold, it will be understood that the anolyte could flowing through an outer tank and an catholyte could flow through the macro porous support scaffold.

In an aspect, a pre-filled macro porous support scaffold may be used given that the scaffold can be built or formed to the desired shape.

A green body support scaffold may be formed into an open cylinder shape using a pre-made mold. An ionic conductive membrane may be deposited along the surface of the open cylinder shaped green body support scaffold. The green body support scaffold may then be converted to a macro porous support scaffold through pyrolysis. The ionic conductive membrane may be sintered. An illustration of the membrane structure formation can be seen in FIGS. 5a-c.

FIG. 5d is a representation of an exemplary redox flow battery including the example of FIG. 5c. As shown, a catholyte flows through an outer tank and through a center of the cylinder, and an anolyte flows through the macro porous support scaffold, and an ionic constitute of the catholyte or anolyte passes through the dense ionic conductive membranes. The positive terminal is connected to a positive electrode, and the negative terminal is connected to the macro porous support scaffold. The macro porous support scaffold may be formed from an electrode material or may be coated with an electrode material. By way of example, the macro porous support scaffold may be formed from, for example, a copper foam. By way of another example, the macro porous support scaffold may be coated with metallic copper. Energy is extracted through the positive and negative terminals to power an energy load or energy is stored from an energy source, such as a solar panel. Although FIG. 5d shows a catholyte flowing through an outer tank and center of the component, and an anolyte flows through the macro porous support scaffold, it will be understood that the anolyte and catholyte could be reversed.

In an aspect, a pre-filled macro porous support scaffold may be used given that the scaffold can be built or formed to the desired open cylinder shape.

A green body support scaffold may be formed into an open cylinder shape using a pre-made mold. An electrode foil may be wrapped around the green body support scaffold. A second green body support scaffold may be formed around the electrode foil using a pre-made mold. An ionic conductive membrane may then be formed on the inner and outer surfaces of the green body support scaffold. The green body support scaffold can then be converted to a macro porous support scaffold through pyrolysis. The ionic conductive membrane may be sintered. An illustration of the membrane structure formation can be seen in FIGS. 6a-c.

FIG. 6d is a representation of an exemplary redox flow battery including the example of FIG. 6c. As shown, a catholyte flows through an outer tank and through a center of the cylinder, and an anolyte flows through the macro porous support scaffold, and an ionic constitute of the catholyte or anolyte passes through the dense ionic conductive membranes. The positive terminal is connected to a positive electrode, and the negative terminal is connected to the electrode foil. Energy is extracted through the positive and negative terminals to power an energy load or energy is stored from an energy source, such as a solar panel. Although FIG. 6d shows a catholyte flowing through an outer tank and center of the component, and an anolyte flows through the macro porous support scaffold, it will be understood that the anolyte and catholyte could be reversed.

In an aspect, a pre-filled macro porous support scaffold may be used given that the scaffold can be built or formed to the desired open cylinder shape.

In an aspect, the membrane structure may be placed into a tank where said tank can then be filled with a catholyte. The macro porous support structure may be filled with an anolyte where the ionic conductive membrane separates the two liquids. In this design requires that lithium metal or a lithium film coated onto a current collector is used as the electrode foil. Alternatively, the membrane structure may be placed into a tank where said tank can then be filled with an anolyte. The macro porous support structure may be filled with a catholyte where the ionic conductive membrane separates the two liquids. In this design the electrode foil may vary to suit the needs of the redox flow system.

An electrode foil may be wrapped into the shape of an open cylinder. A cylinder shaped green body support scaffold may then be formed around the cylinder-shaped electrode foil using a pre-made mold. This green body support scaffold is designated as green body support scaffold one. An ionic conductive membrane may be formed around green body support scaffold one. Green body support scaffold one may then be converted to a macro porous support scaffold designated as macro porous support scaffold one. The ionic conductive membrane may be sintered. A second cylinder shaped green body support scaffold may then be formed on top of (or around) the ionic conductive membrane using a pre-made mold. This green body support scaffold may then be converted to a macro porous support scaffold designated as macro porous support scaffold two. A second electrode foil may then be wrapped around macro porous support scaffold two. An illustration of the membrane structure formation can be seen in FIGS. 7a-c. Optionally, the metallic surface of the chamber may act as the electrode thus an outer electrode foil may not be needed.

FIG. 7d is a representation of an exemplary redox flow battery including the example of FIG. 7c. As shown, a catholyte flows through the outer macro porous support scaffold and the anolyte flows through the inner macro porous support scaffold, and an ionic constitute of the catholyte or anolyte passes through the dense ionic conductive membranes. The positive terminal is connected to an outer electrode foil, and the negative terminal is connected to the inner electrode foil. Energy is extracted through the positive and negative terminals to power an energy load or energy is stored from an energy source, such as a solar panel. Although FIG. 7d shows a catholyte flowing through an outer macro porous support scaffold, and an anolyte flows through the inner macro porous support scaffold, it will be understood that the anolyte and catholyte could be reversed. Also, although FIG. 7d shows the positive terminal connected to the outer electrode foil and the negative terminal connected to the inner electrode foil, it will be understood that the positive and negative terminals could be reversed.

In an aspect, pre-filled macro porous support scaffolds may be used given that the scaffolds can be built or formed to the desired open cylinder shape.

In an aspect, the membrane structure may be described as a standalone redox flow system. In this regard macro porous support scaffold, one can be filled with an anolyte and the inner electrode foil may either be lithium foil or a lithium film deposited onto a current collector. Thus, macro porous support scaffold two may be filled with a catholyte with the respective electrode foil required. Vice versa, macro porous support scaffold one may be filled with a catholyte and macro porous support scaffold two may be filled with an anolyte with the outer electrode foil composed of lithium foil or lithium film coated onto a current collector.

A cylinder shaped green body support scaffold may be formed using pre-made mold. Note, unlike previous described membrane structures, the cylinder shape may be a closed cylinder as opposed to an open shaped cylinder. This green body support scaffold is designated as green body support scaffold one. An ionic conductive membrane may be formed around green body support scaffold one. Green body support scaffold one may then be converted to a macro porous support scaffold designated as macro porous support scaffold one. The ionic conductive membrane may be sintered. A second cylinder shaped green body support scaffold may then be formed on top of (or around) the ionic conductive membrane using a pre-made mold. This green body support scaffold may then be converted to a macro porous support scaffold designated as macro porous support scaffold two. Electrode materials may then conformally deposited along the surface of the macro porous support scaffolds. An illustration of the membrane structure formation can be seen in FIGS. 8a-c.

FIG. 8d is a representation of an exemplary redox flow battery including the example of FIG. 8c. As shown, a catholyte flows through the outer macro porous support scaffold and the anolyte flows through the inner macro porous support scaffold, and an ionic constitute of the catholyte or anolyte passes through the dense ionic conductive membranes. The positive terminal is connected to the outer macro porous support scaffold, and the negative terminal is connected to the inner macro porous support scaffold. Energy is extracted through the positive and negative terminals to power an energy load or energy is stored from an energy source, such as a solar panel. Although FIG. 8d shows a catholyte flowing through an outer macro porous support scaffold, and an anolyte flows through the inner macro porous support scaffold, it will be understood that the anolyte and catholyte could be reversed. Also, although FIG. 8d shows the positive terminal connected to the outer macro porous support scaffold and the negative terminal connected to the inner macro porous support scaffold, it will be understood that the positive and negative terminals could be reversed. The macro porous support scaffolds may be formed from an electrode material or may be coated with an electrode material. By way of example, the macro porous support scaffolds may be formed from, for example, a copper foam. By way of another example, the macro porous support scaffolds may be coated with metallic copper.

In an aspect, pre-filled macro porous support scaffolds may be used given that the scaffolds can be built or formed to the desired solid and open cylinder shapes.

In an aspect, the membrane structure may be described as a standalone redox flow system. In this regard macro porous support scaffold, one may be filled with an anolyte and the conformally deposited electrode can be lithium. Thus, macro porous support scaffold two may be filled with a catholyte with the respective electrode materials can be conformally deposited. Vice versa, macro porous support scaffold one may be filled with a catholyte and macro porous support scaffold two may be filled with an anolyte with the respective electrode conformally deposited.

All the corresponding ions may be replaced with other alkaline metal ions, such as Na and K and the solid-state electrolyte can be replaced with the corresponding alkaline metal ion solid state electrolyte. For vanadium redox flow batteries, the membrane can be replaced with corresponding proton membranes.

Although various embodiments of the disclosed method for manufacturing a solid state ionic conductive membrane have been shown and described, modifications may occur to those skilled in the art upon reading the specification. The present application includes such modifications and is limited only by the scope of the claims.

What is claimed is:
1. A redox flow battery, comprising:
a positive terminal;
a negative terminal; and
a first solid state ionic conductive membrane supported by and in contact with a first macro porous support scaffold between the positive terminal and the negative terminal.
2. A method of using the redox flow battery of claim 1, the method comprising:
flowing an electrolyte through the first macro porous support scaffold; and passing a ionic component of the electrolyte through the first solid state ionic conductive membrane.

3. A component for a redox flow battery comprising a first solid state ionic conductive membrane fabricated directly on a first macro porous support scaffold.

4. A method for manufacturing a component for a redox flow battery of claim 3, the method comprising:
forming a solid state ionic conductive membrane on a support scaffold; and
treating the support scaffold to be macro porous after the forming step.

5. The redox flow battery of claim 1, further comprising a second solid state ionic conductive membrane in contact with the first macro porous support scaffold opposite to the first solid state ionic conductive membrane.

6. The method of claim 2, wherein the ionic component includes hydrogen ions, lithium ions, sodium ions, potassium ions, silver ions, magnesium ions, aluminum ions, or zinc ions.

7. The component of claim 3, further comprising an interface layer directly on first solid state ionic conductive membrane.

8. The component of claim 7, further comprising a lithium containing material directly on the interface layer.

9. The redox flow battery of claim 1, wherein the first macro porous support scaffold comprises a planar-shaped macro porous support scaffold.

10. The redox flow battery of claim 1, wherein the first macro porous support scaffold comprises a cylindrical-shaped macro porous support scaffold, wherein a cylindrical rod, serving as an electrode terminal, is positioned at the center of the cylindrical-shaped macro porous support scaffold.

11. The redox flow battery of claim 1, wherein the first macro porous support scaffold comprises a tubular-shaped macro porous support scaffold, wherein the first solid-state ionic conductive membrane is supported on the inside surface and a second solid-state ionic conductive membrane is supported on the outside surface of the tubular shaped macro porous support scaffold.

12. The method of claim 4, wherein the step of forming the solid state ionic conductive membrane on the support scaffold comprises at least one of slurry sedimentation, spraying, dipping, filtration, pyrolysis, electroplating, plasma spray, thermal spray, fume spray, screen printing, tape casting, injection, chemical vapor deposition, physical vapor deposition, and sputtering.

13. The method of claim 4, wherein the step of treating the support scaffold to be macro porous comprises separating a filler material from the support scaffold.

14. The method of claim 4, further comprising densifying the solid state ionic conductive membrane formed on the support scaffold.

15. A redox flow battery, comprising:
a positive current collector;
a negative current collector;
a first macro porous support scaffold between the positive current collector and the negative current collector; and
a first solid state ionic conductive membrane formed on the first macro porous support scaffold.

16. The redox flow battery of claim 15, further comprising a second macro porous support scaffold between the positive terminal and the negative terminal, wherein the first solid state ionic conductive membrane is between the first macro porous support scaffold and the second macro porous support scaffold.

17. The redox flow battery of claim 15, further comprising a second macro porous support scaffold, wherein an electrode terminal is positioned between the first and second macro porous support scaffold, and wherein the first solid-state ionic conductive membrane is supported on an outer surface of both the first and second macro porous support scaffolds.

18. The redox flow battery of claim 15, further comprising an outer catholyte tank and an anolyte tank in fluid communication with the first solid state ionic conductive membrane.

19. The redox flow battery of claim 18, further comprising a pump for flowing catholyte from the outer catholyte tank through the first macro porous support scaffold and into fluid contact with the first solid-state ionic conductive membrane.

20. The redox flow battery of claim 19, further comprising a pump for flowing anolyte from the outer anolyte tank through the second macro porous support scaffold and into fluid contact with the first solid-state ionic conductive membrane.

* * * * *